US007727619B2

(12) United States Patent
Okamoto et al.

(10) Patent No.: US 7,727,619 B2
(45) Date of Patent: *Jun. 1, 2010

(54) DEVELOPER CARRYING MEMBER AND DEVELOPING APPARATUS

(75) Inventors: Naoki Okamoto, Shizuoka (JP); Yasuhide Goseki, Kanagawa (JP); Masayoshi Shimamura, Kanagawa (JP); Yasutaka Akashi, Kanagawa (JP); Kazunori Saiki, Kanagawa (JP); Kenji Fujishima, Kanagawa (JP); Satoshi Otake, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

This patent is subject to a terminal disclaimer.

(21) Appl. No.: 10/872,439

(22) Filed: Jun. 22, 2004

(65) Prior Publication Data

US 2005/0095038 A1 May 5, 2005

(30) Foreign Application Priority Data

Oct. 31, 2003 (JP) ............................ 2003-372464

(51) Int. Cl.
*B32B 7/00* (2006.01)

(52) U.S. Cl. ....................... 428/206; 428/220; 428/323; 428/325; 428/908.8

(58) Field of Classification Search ................. 428/323, 428/325, 908.8, 124, 206, 220
See application file for complete search history.

(56) References Cited

U.S. PATENT DOCUMENTS 5,175,070 A 12/1992 Tanikawa et al. ............ 430/122
5,175,586 A 12/1992 Goseki et al. ............... 355/259
5,202,731 A 4/1993 Tanikawa et al. ............ 355/251
5,274,426 A 12/1993 Goseki et al. ............... 355/259
5,547,724 A 8/1996 Kuribayashi ............... 428/35.8
5,618,647 A 4/1997 Kukimoto et al. ........ 430/106.6
5,700,616 A * 12/1997 Kasuya et al. ......... 430/108.23
5,849,453 A 12/1998 Mikuriya et al. ............ 430/125
5,860,050 A 1/1999 Shimamura et al. ......... 399/276
5,998,008 A 12/1999 Shimamura et al. ......... 428/323
6,115,575 A 9/2000 Kinoshita et al. ........... 399/286

(Continued)

FOREIGN PATENT DOCUMENTS

EP 1 308 796 A2 5/2003

(Continued)

OTHER PUBLICATIONS

European Communication dated Nov. 27, 2009 in European Application No. 04014846.2-2209/1528440.

(Continued)

*Primary Examiner*—Betelhem Shewareged
(74) *Attorney, Agent, or Firm*—Fitzpatrick, Cella, Harper & Scinto

(57) ABSTRACT

In a developer carrying member used in a developing apparatus by means of which an electrostatic latent image formed on an electrostatic latent image bearing member is developed with a developer to render it visible, the developer carrying member has at least a substrate and a resin coat layer formed on the substrate surface, and the resin coat layer contains at least a binder resin and graphitized particles. The surface of the resin coat layer has an average value A and a standard deviation σ of $100 \leqq A \leqq 800$ (N/mm$^2$) and $\sigma < 30$ (N/mm$^2$), respectively.

3 Claims, 4 Drawing Sheets

U.S. PATENT DOCUMENTS

| | | | | |
|---|---|---|---|---|
| 6,122,473 | A | 9/2000 | Goseki et al. | 399/286 |
| 6,154,625 | A | 11/2000 | Saiki et al. | 399/276 |
| 6,391,511 | B1 | 5/2002 | Okamoto et al. | 430/120 |
| 6,687,476 | B2 | 2/2004 | Goseki et al. | 399/109 |
| 7,361,400 | B2 * | 4/2008 | Shimamura et al. | 428/323 |
| 2003/0123909 | A1 | 7/2003 | Akashi et al. | 399/286 |
| 2003/0232185 | A1 * | 12/2003 | Shimamura et al. | 428/323 |
| 2006/0275598 | A1 * | 12/2006 | Shimamura et al. | 428/323 |

FOREIGN PATENT DOCUMENTS

| | | | |
|---|---|---|---|
| JP | 2-105181 | | 4/1990 |
| JP | 3-36570 | | 2/1991 |
| JP | 3-200986 | | 9/1991 |
| JP | 8-240981 | | 9/1996 |
| JP | 10-293454 | | 11/1998 |
| JP | 10-326040 | | 12/1998 |
| JP | 11-52711 | | 2/1999 |
| JP | 11-249414 | | 9/1999 |
| JP | 2002-311637 | A | 10/2002 |

OTHER PUBLICATIONS

English-language translation of paragraphs [0121] and [0210] of Japanese Patent Document No. 2002-311637 A.

* cited by examiner

DEVELOPER CARRYING MEMBER AND DEVELOPING APPARATUS

BACKGROUND OF THE INVENTION

1. Field of the Invention

This invention relates to a developer carrying member used in a developing apparatus by means of which an electrostatic latent image formed on an electrostatic latent image bearing member such as an electrophotographic photosensitive member or an electrostatic recoding dielectric is developed with a developer to form a toner image in electrophotography, and also relates to a developing apparatus making use of the developer carrying member. This invention still also relates to a developer carrying member whose resin coat layer provided on a substrate of the developer carrying member has been improved, and further relates to a developing apparatus making use of such a developer carrying member.

2. Related Background Art

Conventionally, in electrophotography, copies or prints are obtained by forming an electrostatic latent image on an electrostatic latent image bearing member (photosensitive drum) by utilizing a photoconductive material and by various means, subsequently developing the electrostatic latent image by the use of a developer having a toner, to form a toner image, transferring the toner image to a transfer medium such as paper as occasion calls, and then fixing the toner image to the transfer medium by the action of heat, pressure or heat-and-pressure. Developing systems in electrophotography are grouped into a one-component developing system, which requires no carrier, and a two-component developing system, which makes use of a carrier.

The one-component developing system includes a powder cloud method, in which the toner is used in an atomized state; a contact developing method, in which a toner held on a developer carrying member having a flexibility or elasticity is directly brought into contact with the surface of an electrostatic latent image bearing member to perform development; and a jumping developing method, in which the toner is not brought into direct contact but the toner is caused to fly toward the surface of an electrostatic latent image bearing member by the action of an electric field formed between the electrostatic latent image bearing member and the developer carrying member. A contact one-component developing method or a one-component jumping developing method is commonly used.

Developing apparatus employing the one-component developing system have advantages that they require no carrier and require no mechanism for controlling the concentration of toners and carriers and hence the developing assemblies themselves can be made compact and light-weight.

As toners used in such a developing system, toners with small particle diameter are recently used so that electrophotographic apparatus can be made digital and can be made much higher in image quality. For example, in order to improve resolution and character sharpness to reproduce electrostatic latent images faithfully, toners having a weight-average particle diameter of about 4 to 10 μm are used. It is demanded, for the purpose of more reducing power consumption of apparatus from the viewpoint of ecology, to lower fixing temperature of toners in order to improve fixing performance of the toners, or, for the purpose of making electrophotographic apparatus more compact and light-weight, to improve transfer efficiency of toners in order to reduce waste toner. In order to improve fixing performance of toners, glass transition temperature (Tg) of binder resins used in the toners are made lower, or low-molecular weight components are made larger in proportion in molecular weight distribution of binder resins. Also, in order to improve anti-offset properties of toners, a method is known in which a wax capable of improving plasticity of binder resins is added to toner particles. Still also, in order to improve transfer efficiency of toners, a method is known in which a transfer efficiency improver having an average particle diameter of 0.1 to 3 μm and a hydrophobic silica fine powder having a BET specific surface area of 50 to 300 $m^2/g$ are added to toner particles, or in which toner particles are spherical-treated by mechanical impact force.

As a first method for controlling charge quantity of toners, it is prevalent to add a charge control agent to toner particles. However, dyes or pigments used as charge control agents have a tendency of adhering to various members when added to toner particles in a large quantity.

As a second method for controlling charge quantity of toners, a method is proposed in which a suitable material is used in triboelectric charge-providing members so as to make toners have proper charge quantity.

In the developing apparatus employing the one-component developing system, the toner comes into contact with a developer carrying member and a developer layer thickness control member when it is passed through the part between the developer carrying member and the developer layer thickness control member so as to be made into a thin layer, and hence these members have a great influence on making the toner have proper charge quantity. In particular, in the case of a developing apparatus employing a magnetic one-component developing system, which makes use of a magnetic toner, the magnetic toner moves on the developer carrying member by the action of a magnetic force of a magnet built in the developer carrying member, and hence the magnetic toner is frequently rubbed against the developer carrying member. Accordingly, the selection of materials for the developer carrying member has a great influence on the charging performance of the magnetic toner.

As developer carrying members used in the one-component developing system, commonly used are, in the contact developing method, one in which an elastic member of urethane rubber, EPDM rubber, silicone rubber or the like is molded on a shaft made of a metal such as stainless steel, and one in which a layer of an elastomer is formed on the surface of a cylindrical member of aluminum or stainless steel. In this case, the elastic member is incorporated therein with components such as a plasticizer, a vulcanizing agent, a release agent and a low-molecular weight component. It is proposed to provide a barrier layer or a protective layer on the layer surface of the elastic member so that these components can be prevented from bleeding out of the elastic member to affect members adversely. It is further proposed to form at the outermost surface a surface layer using a resin using a material having good release properties or using a resin having good charge-providing properties to toners.

As disclosed in Japanese Patent Applications Laid-Open No. H02-105181 and No. H03-036570, proposed is, as a developer carrying member (developing sleeve) used in a non-contact one-component developing method, a developing sleeve comprising a developing-sleeve substrate on the surface of which a resin coat layer is formed in which a conductive material such as carbon black or graphite and a solid lubricant stand dispersed in a binder resin having good charge-providing properties. However, the surface profile of the developing sleeve has a great influence. Hence, if the surface profile of the developing sleeve has changed as a result of repeated use, the coat level of the toner can not easily be made stable, and the developing performance tends to become unstable. A sufficient performance may be achievable in low-volume process cartridges, which are not required to have durability (running performance) so much. However, in the case of high-volume process cartridges, which are required to have a high durability, the surface profile of the developing sleeve may greatly change because of scrape of the resin coat layer to tend to result in a great change in toner's coat level as well. Such a change in coat level of the toner has an influence also on the chargeability of the toner because the frequency of rubbing between the toner and the developing sleeve changes.

As disclosed in Japanese Patent Application Laid-Open No. H03-200986, a developing sleeve is proposed to the surface of which spherical fine particles have been added to form unevenness on the developing-sleeve surface. Such a method in which spherical particles are added is a good means in order to form a surface profile with uniform unevenness and make stable the coat level of the toner. However, when the developing sleeve is repeatedly used over a long period of time, or in a developing method in which a strong stress is applied to the surface of the developing sleeve, the use of spherical resin particles as the spherical fine particles may cause scrape during repeated use over a long period of time to make the resin coat layer of the developing sleeve have a low surface roughness, so that the coat level of the toner may decrease and also the melt adhesion of toner tends to occur.

As disclosed in Japanese Patent Application Laid-Open No. H08-240981, a developing sleeve is proposed in which conductive spherical particles having a true density of 3 $g/cm^3$ or less have been added to a resin layer of the developing sleeve to form unevenness on the surface of the developing sleeve. Such a developing sleeve makes stable the coat level of the toner and also the conductive spherical particles themselves haves a good wear resistance. Hence, the stress applied to the toner between the developing sleeve and the developer layer thickness control member is relaxed to bring an improvement in durability of the resin coat layer itself. However, at resin portions present between conductive spherical particles, the scrape may selectively progress because of the repeated use over a long period of time and the rubbing with the toner, so that the resin coat layer may change in surface roughness to therefore tend to cause a change in coat level of the toner.

In the developing apparatus employing the one-component developing system, it is long awaited to provide a developing sleeve whose resin coat layer which forms the surface layer of the developing sleeve has been more improved.

SUMMARY OF THE INVENTION

An object of the present invention is to provide a developer carrying member at the surface of which a resin coat layer having a uniform surface profile is formed and in which the resin coat layer has a good durability even when used repeatedly over a long period of time in every environment, and the resin coat layer can not easily selectively be scraped, so that it can keep its surface roughness from changing, can control the coat level of the toner in a constant quantity and also can provide the toner with a proper charge quantity; and to provide a developing apparatus making use of such a developer carrying member.

Another object of the present invention is to provide a developer carrying member that can not easily cause problems such as image density decrease, fog and spots around character images, can stably obtain images at a high quality level, can not easily cause melt-adhesion of the toner or rub scratches on the surface of the developer layer thickness control member and can not easily cause lines or non-uniformity on toner images, even when used repeatedly over a long period of time in every environment; and to provide a developing apparatus making use of such a developer carrying member.

To achieve the above objects, the present invention provides a developer carrying member for carrying a developer, comprising a substrate and a resin coat layer formed on the surface of the substrate, wherein;

the resin coat layer contains at least a binder resin and graphitized particles;

the graphitized particles have a degree of graphitization p (002) of $0.20 \leqq p\ (002) \leqq 0.95$; and the surface of the resin coat layer has an average value A and a standard deviation σ of:

$$100 \leqq A \leqq 800 (N/mm^2);\ \text{and}$$

$$\sigma < 30 (N/mm^2);$$

which are determined from the hardness distribution of measured values HU of universal hardness in a surface physical-property test, calculated according to the following expression (1):

$$\text{Universal hardness value } HU = K \times F/h^2 (N/mm^2) \quad (1)$$

where K represents a constant, F represents a test load (N), and h represents the maximum indentation depth (mm) of an indenter.

The present invention further provides a developing apparatus comprising a developer container, a developer carrying member for carrying and transporting thereon a developer held in the developer container, and a developer layer thickness control member for forming a thin layer of the developer on the developer carrying member, provided in proximity to or in pressure contact with the developer carrying member;

the developing apparatus being an apparatus by means of which the developer is carried and transported by the developer carrying member to a developing zone facing an electrostatic latent image bearing member and an electrostatic latent image formed on the electrostatic latent image bearing member is developed with the developer to form a toner image; and the developer carrying member comprising a substrate and a resin coat layer formed on the surface of the substrate, wherein;

the resin coat layer contains at least a binder resin and graphitized particles;

the graphitized particles have a degree of graphitization p (002) of $0.20 \leqq p\ (002) \leqq 0.95$; and the surface of the resin coat layer has an average value A and a standard deviation σ of:

$$100 \leqq A \leqq 800 (N/mm^2);\ \text{and}$$

$$\sigma < 30 (N/mm^2);$$

which are determined from the hardness distribution of measured values HU of universal hardness in a surface physical-property test, calculated according to the following expression (1):

$$\text{Universal hardness value } HU = K \times F/h^2 (N/mm^2) \quad (1)$$

where K represents a constant, F represents a test load (N), and h represents the maximum indentation depth (mm) of an indenter.

DESCRIPTION OF THE PREFERRED EMBODIMENTS

The present inventors have discovered that the construction taken as described above brings the following effect: the profile of the coat layer surface of the resin coat layer of the developer carrying member surface at the initial stage of many-sheet running can be made uniform, and, even when many-sheet running is performed, the change in surface roughness of the resin coat layer can be made small and the change in coat level of the toner can also be made small, the toner can properly uniformly be charged even at the latter stage of many-sheet running, and also good images can be obtained over a long period of time in every environment.

The present invention is described below in detail with reference to FIG. 1.

Figure 1:
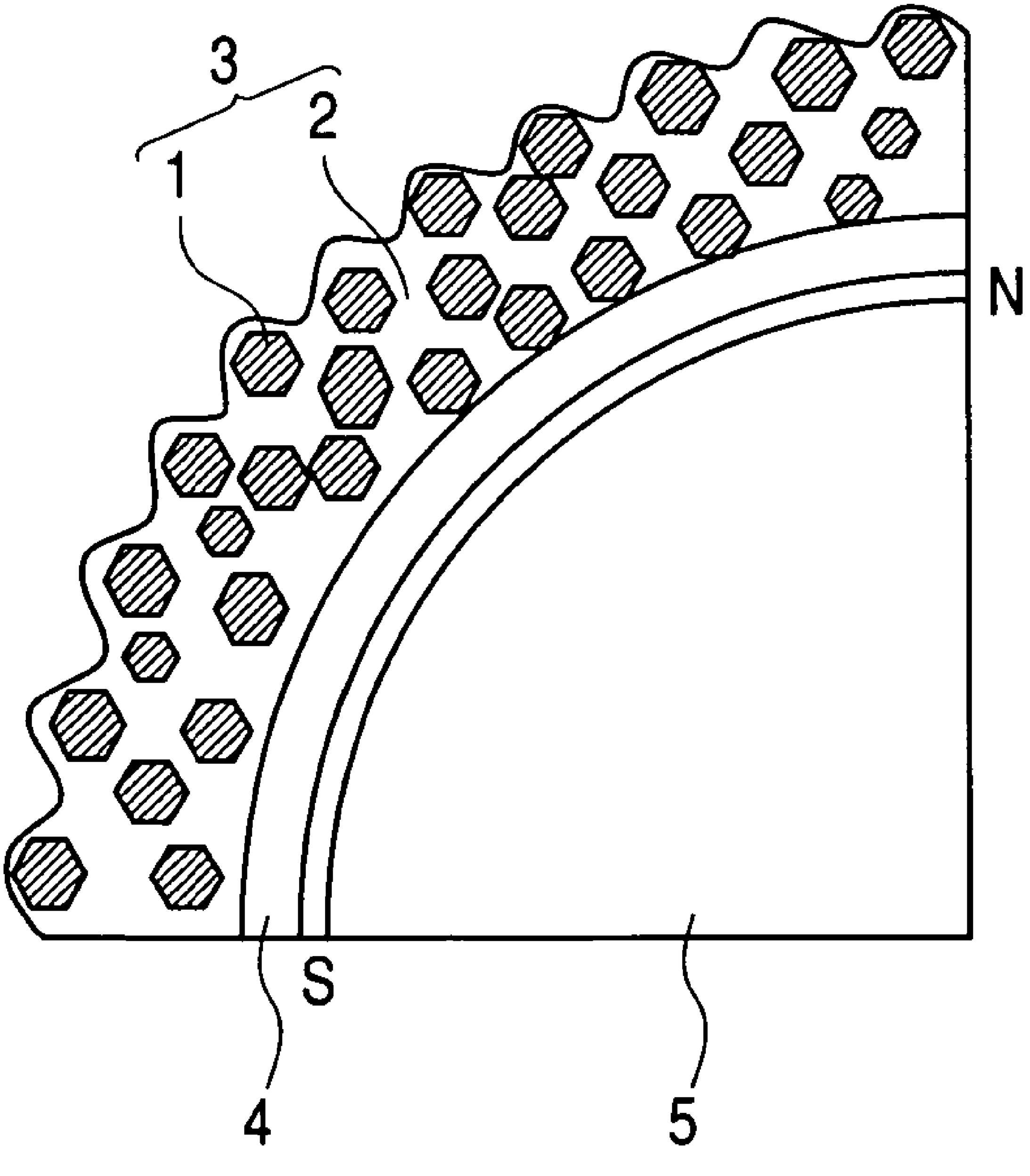
FIG. 1 is a diagrammatic view showing a section on the developer carrying member of the present invention.

FIG. 1 is a diagrammatic view showing a section on the developer carrying member (developing sleeve) of the present invention. The developing sleeve has a magnet 5 built in a cylindrical substrate 4, having a stated magnetic force and magnetic-pole structure. On the surface of the substrate 4, a resin coat layer 3 is formed in which graphitized particles 1 stand uniformly dispersed in a binder resin 2 and which has a uniform surface profile.

The graphitized particles 1 used in the resin coat layer 3 of the surface of the developing sleeve according to the present invention have a degree of graphitization p (002) of $0.20 \leqq p\ (002) \leqq 0.95$, and can make proper the charge quantity of the toner because they exhibit good conductivity. They also can keep the resin coat layer from being scraped, even when used repeatedly over a long period of time, because they have superior wear resistance compared with conventional graphite particles. Thus, the coat level of the toner can be made stable over a long period of time.

The resin coat layer 3 of the surface of the developing sleeve according to the present invention contains at least graphitized particles 1 having superior wear resistance, and also its surface has an average value A and a standard deviation σ of $100 \leqq A \leqq 800$ (N/mm$^2$) and $\sigma < 30$ (N/mm$^2$), respectively, which are determined from the hardness distribution of measured values HU of universal hardness. The resin coat layer 3 of the surface of the developing sleeve according to the present invention may preferably have an arithmetic-mean roughness Ra of from 0.20 μm to 0.70 μm according to JIS B 0601 (hereinafter also simply "low-Ra system"). Compared with a low-Ra system of the conventional graphite particles, the developing sleeve of the present invention does not cause any selective scrape in the resin coat layer, and the coat layer surface is uniformly scraped even when scraped as a result of repeated use over a long period of time, and at the same time the surface has micro-unevenness for maintaining the low Ra. Hence, the effect can be brought out such that the resin coat layer can be kept from changing in surface profile and the toner charge quantity and toner coat level can be made stabler.

The developer carrying member of the present invention and the developing apparatus making use of the same are described below in greater detail.

The graphitized particles 1 used in the resin coat layer 3 of the developer carrying member of the present invention are described.

The graphitized particles 1 used in the present invention have the degree of graphitization p (002) of $0.20 \leqq p\ (002) \leqq 0.95$.

The degree of graphitization p (002) is a value called Franklin's p-value, and is determined as $d\ (002) = 3.440 - 0.086\ (1 - P^2)$ by measuring the lattice spacing d (002) obtained from an X-ray diffraction pattern of graphite. This p-value shows the proportion of disorderly portions among stacks of hexagonal network planes of carbon. The smaller the value is, the larger the degree of graphitization is.

The graphitized particles 1 used in the present invention differ in raw materials and production steps, from crystallizable graphite particles composed of artificial graphite or natural graphite obtained by hardening an aggregate such as coke with a tar pitch, and molding the hardened matter, followed by firing at approximately from 1,000° C. to 1,300° C. and then graphitization at approximately from 2,500° C. to 3,000° C., which are used in the resin coat layer of the developer carrying member surface as disclosed in Japanese Patent Applications Laid-Open No. H02-105181 and No. H03-036570. The graphitized particles 1 used in the present invention have a little lower degree of graphitization than the crystallizable graphite particles conventionally used, but have the same high conductivity and lubricity as the crystallizable graphite particles conventionally used, and further have a characteristic feature that they are substantially spherical and besides the hardness of particles themselves is relatively high, as being different from the scaly shape or acicular shape of the crystallizable graphite particles conventionally used. Hence, inasmuch as the developer carrying member of the present invention has the resin coat layer containing such graphitized particles having good conductivity and high lubricity, the charge quantity of the toner can be made proper and also the toner can be kept from melt-adhering to the resin coat layer surface. Moreover, the graphitized particles having the shape as described above can readily uniformly be dispersed in the resin coat layer, and hence provide the resin coat layer surface with uniform surface profile and wear resistance. In addition, the shape of the graphitized particles themselves can not easily change, and hence the resin coat layer can be kept from being scraped, even when used repeatedly over a long period of time, and the toner charge quantity and toner coat level can be made stable over a long period of time.

The graphitized particles used in the present invention have the degree of graphitization p (002) of $0.20 \leqq p\ (002) \leqq 0.95$, which may preferably be $0.25 \leqq p\ (002) \leqq 0.75$.

If they have a degree of graphitization p (002) of more than 0.95, they have good wear resistance, but may have low conductivity and lubricity to cause image density decrease and blotches because of a phenomenon of charge-up of the toner, and may further cause rub scratches on the developer layer thickness control member when an elastic member is used in the control member, tending to cause lines or non-uniformity in solid images. If they have a degree of graphitization p (002) of less than 0.20, the resin coat layer may have a low mechanical strength because of a lowering of wear resistance of the graphitized particles to cause the selective scrape of the resin coat layer, tending to cause faulty images.

The graphitized particles used in the present invention, as being set to have the degree of graphitization p (002) of $0.20 \leqq p\ (002) \leqq 0.95$, has the effect that they have good conductivity and high lubricity and also can prevent the mechanical strength of the resin coat layer from lowering to keep the resin coat layer from being selectively scraped. Moreover, setting the degree of graphitization p (002) of the graphitized particles within the specific range makes the graphitized particles have a hardness close to the hardness of the resin. Hence, the resin coat layer is uniformly scraped even when the surface of the resin coat layer wears, so that the graphitized particles again come exposed from the interior of the resin coat layer. Hence, the surface composition may less change, and the surface profile as well can retain uniform micro-unevenness.

The graphitized particles used in the present invention may preferably have a volume-average particle diameter of from 0.5 μm to 4.0 μm. Since the resin coat layer in the present invention may preferably have the JIS B 0601 arithmetic-mean roughness Ra of from 0.20 μm to 0.70 μm, if the graphitized particles have a volume-average particle diameter of less than 0.5 μm, the effect of providing the resin coat layer surface with uniform roughness may be so small as to make it difficult to set the surface roughness Ra to 0.20 μm or more. This may lower rapid and uniform charge-providing properties to the developer, and also tends to cause image density decrease and blotches because of the phenomenon of charge-up of the toner. If the graphitized particles have a volume-average particle diameter of more than 4.0 μm, such particles may make it difficult to set the surface roughness Ra of the resin coat layer to 0.70 μm or less. Also, such particles may make the resin coat layer have a higher surface roughness depending on repeated use over a long period of time, resulting in a large coat level of the toner to tend to cause an image density decrease due to lack of charge of the toner, and faulty images such as fog and spots around character images. The graphitized particles used in the present invention, as being set to have the volume-average particle diameter of from 0.5 μm to 4.0 μm, can make it easy to control the surface roughness of the resin coat layer, and can make stabler the toner charge quantity and toner coat level.

As a method for obtaining the graphitized particles used in the present invention, a method as shown below is preferable. The method is not necessarily limited to the following.

As the method for obtaining the graphitized particles used in the present invention, graphitization is effected using, as a raw material, particles which are optically anisotropic and formed of a single phase, such as mesocarbon microbeads or bulk-mesophase pitch. This is preferable in order to make the graphitized particles have a high degree of graphitization and also retain their spherical shape. Optical anisotropy of the raw material comes from stacks of aromatic molecules, and its orderliness develops further by graphitization treatment, so that the graphitized particles having a high degree of graphitization can be obtained.

In the case when the bulk-mesophase pitch is used as the raw material from which the graphitized particles used in the present invention are to be obtained, a bulk-mesophase pitch capable of softening and melting upon heating may preferably be used in order to obtain graphitized particles which are spherical and have a high degree of graphitization. For example, the bulk-mesophase pitch is mesophase pitch obtained by extracting β-resin from coal-tar pitch by solvent fractionation and hydrogenating the β-resin to carry out heavy-duty treatment. Also usable is mesophase pitch obtained by finely pulverizing the β-resin after its heavy-duty treatment and then removing the solvent-soluble matter using benzene or toluene. The bulk-mesophase pitch may preferably have 95% by weight or more of quinoline-soluble matter. If one having less than 95% by weight of the same is used, the interiors of particles can not easily be liquid-phase carbonized, and hence may come solid-phase carbonized to form carbonized particles whose shape is kept in a crushed state, making it difficult to obtain spherical particles.

Next, as a method for graphitizing the mesophase pitch, the bulk-mesophase pitch is finely pulverized into a size of from 1 μm to 6 μm in volume-average particle diameter to obtain particles, and the particles obtained are subjected to heat treatment in air at about 200° C. to about 350° C. to carry out oxidation treatment lightly. This oxidation treatment makes the bulk-mesophase pitch particles infusible only at their surfaces, and the particles are prevented from melting or fusing at the time of heat treatment for graphitization in the next step. The bulk-mesophase pitch particles having been subjected to oxidation treatment may preferably have an oxygen content of from 5% by weight to 15% by weight. If they have an oxygen content of less than 5% by weight, particles tend to fuse one another at the time of heat treatment, undesirably. If they have an oxygen content of more than 15% by weight, particles may be oxidized up to their interiors, and may be graphitized as their shape is in a crushed state, making it difficult to obtain spherical particles. Next, the bulk-mesophase pitch particles having been subjected to oxidation treatment are subjected to heat treatment at 2,000° C. to 3,500° C. in an inert atmosphere of nitrogen or argon to obtain the desired graphitized particles.

A method for obtaining the mesocarbon microbeads, another preferable raw material for obtaining the graphitized particles used in the present invention, is a method in which coal type heavy oil or petroleum type heavy oil is subjected to heat treatment at a temperature of from 300° C. to 500° C. to effect polycondensation to form crude mesocarbon microbeads, then the reaction product is subjected to treatment such as filtration, sedimentation by leaving at rest, or centrifugation, to separate mesocarbon microbeads, and thereafter the mesocarbon microbeads are washed with a solvent such as benzene, toluene or xylene, further followed by drying to obtain the desired mesocarbon microbeads.

As a method for effecting graphitization using the mesocarbon microbeads, the mesocarbon microbeads having been dried are kept mechanically primarily dispersed by a force mild enough not to break them. This is preferable in order to prevent particles from coalescing after graphitization or obtain uniform particles. The mesocarbon microbeads having been thus kept primarily dispersed are subjected to primary heat treatment at a temperature of from 200° C. to 1,500° C. in an inert atmosphere to undergo carbonization. The particles of the carbonized product thus obtained by this primary heat treatment are mechanically dispersed by a force mild enough not to break them. This is preferable in order to prevent particles from coalescing after graphitization or obtain uniform particles. The carbonized-product particles having been subjected to secondary dispersion treatment are subjected to secondary heat treatment at a temperature of from 2,000° C. to 3,500° C. in an inert atmosphere to obtain the desired graphitized particles.

The graphitized particles thus obtained are also kept to have a uniform particle size distribution to a certain extent by classification. This is preferable in order to make the resin coat layer have a uniform surface profile.

The graphitized particles may also preferably be fired at a temperature of from 2,000° C. to 3,500° C., and more preferably from 2,300° C. to 3,200° C. If the graphitized particles are fired at a temperature lower than 2,000° C., they may have a low degree of graphitization, and may have low conductivity and lubricity to cause image density decrease and blotches because of the phenomenon of charge-up of the toner. Such particles may further cause rub scratches on the developer layer thickness control member when an elastic member is used in the control member, tending to cause lines or non-uniformity in solid images. If they are fired at a temperature higher than 3,500° C., the graphitized particles may have a too high degree of graphitization, and hence the graphitized particles may have a low hardness to make the resin coat layer have a low mechanical strength because of a lowering of wear resistance of the graphitized particles to cause the selective scrape of the resin coat layer, tending to cause faulty images.

The graphitized particles standing dispersed in the resin coat layer may preferably be in a content of from 2 to 150 parts by weight, and more preferably from 4 to 100 parts by weight, based on 100 parts by weight of the binder resin in the resin coat layer, within the range of which they give especially preferable results. If the graphitized particles are in a content of less than 2 parts by weight, the addition of the graphitized particles may be less effective. If they are in a content of more than 150 parts by weight, the resin coat layer may have a low adherence, resulting in a low wear resistance.

The surface roughness, hardness, average value A determined from its hardness distribution, and standard deviation σ of the resin coat layer in the present invention are described below.

The surface of the resin coat layer is set to have an average value A and a standard deviation a of:

$$100 \leqq A \leqq 800 (\mathrm{N/mm^2}); \text{ and}$$

$$\sigma \leqq 30 (\mathrm{N/mm^2});$$

which are determined from the hardness distribution of measured values HU of universal hardness in a surface physical-property test, calculated according to the following expression (1):

$$\text{Universal hardness value } HU = K \times F/h^2 (\mathrm{N/mm^2}) \quad (1)$$

where K represents a constant, F represents a test load (N), and h represents the maximum indentation depth (mm) of an indenter.

The surface of the resin coat layer may preferably be set to have an arithmetic-mean roughness Ra of from 0.20 μm to 0.70 μm according to JIS B 0601.

Figure 2:
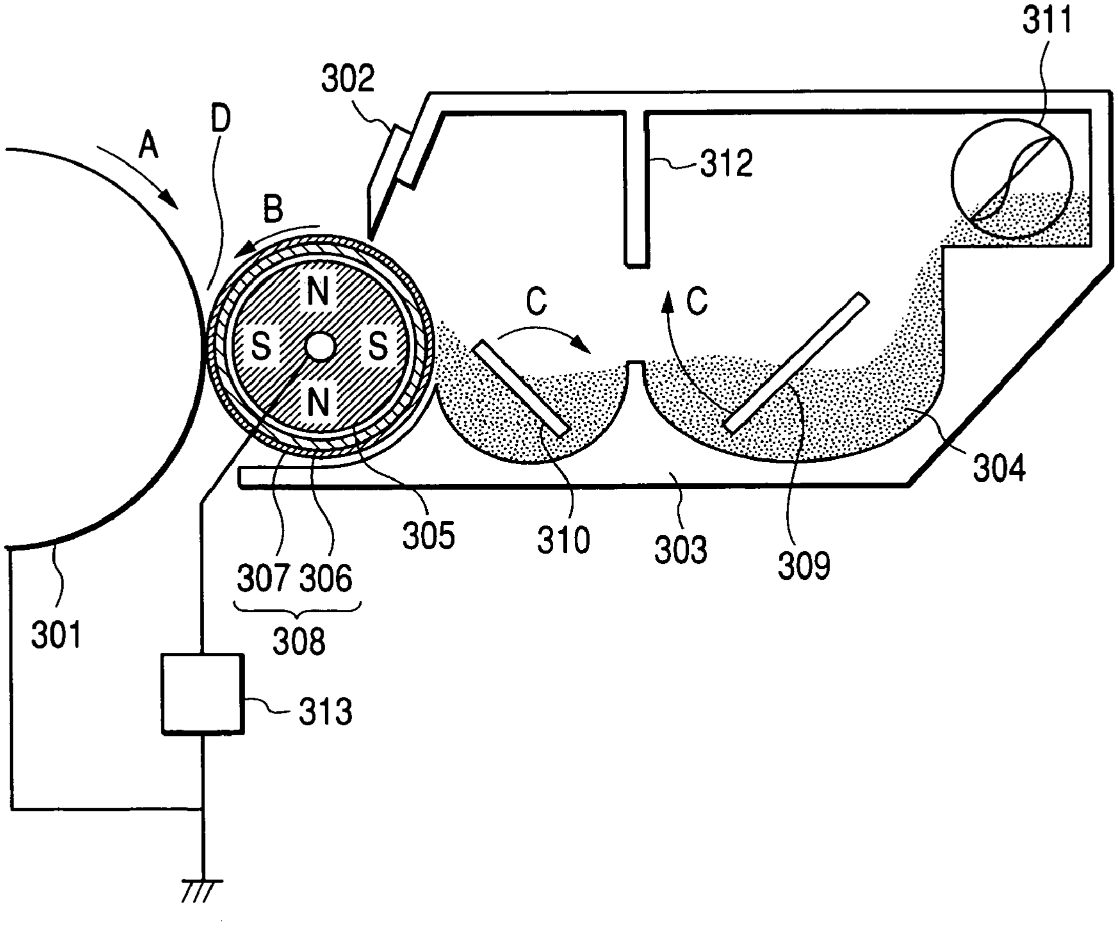
FIG. 2 is a diagrammatic view showing an example of the developing apparatus of the present invention.
Figure 3:
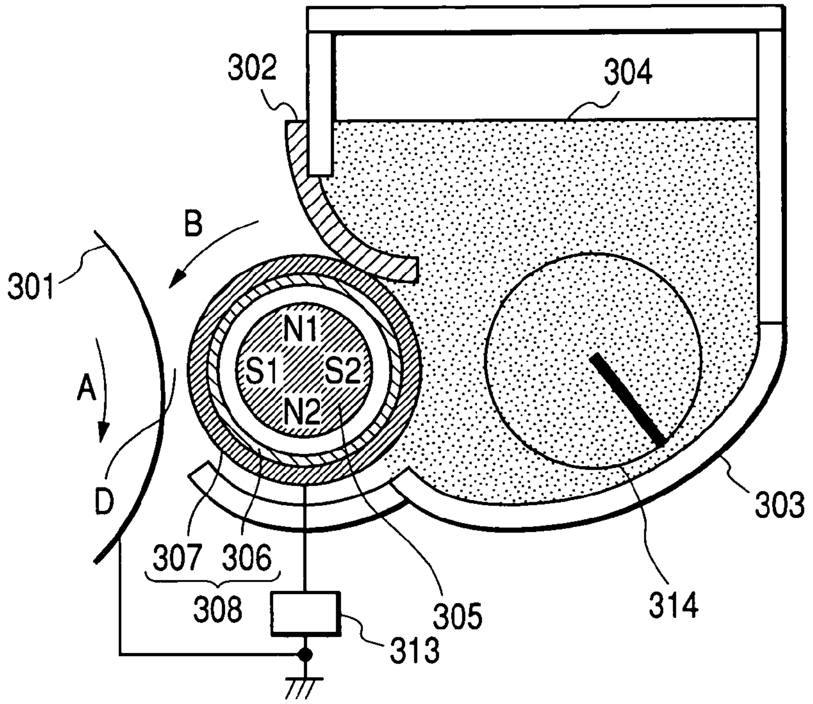
FIG. 3 is a diagrammatic view showing another example of the developing apparatus of the present invention.

As to the surface roughness Ra, preferable surface roughness may differ depending on the developing system. In a developing apparatus having, as a developer layer thickness control member 302 as shown in FIG. 2, a magnetic blade disposed facing the developing sleeve and leaving a gap between them, or in a developing apparatus having, as a developer layer thickness control member 302 as shown in FIG. 3, an elastic blade provided in pressure contact with the developing sleeve at a stated pressure, the surface roughness of the resin coat layer surface may preferably be the low-Ra system and the Ra may preferably be from 0.20 μm to 0.70 μm, in the thin-layer system in which the magnetic toner with a microscopic particle diameter is thin coated on the developing sleeve. If the Ra is smaller than 0.20 μm, the toner may be in a small coat level to tend to cause image density decrease, toner charge-up phenomenon or blotches because of the fact that the toner is in a small coat level. If on the other hand the Ra is larger than 0.70 μm, the toner tends to be in a large coat level, so that the uniformity of triboelectric charging to the toner may lower to tend to cause spots around character images, fog, and image density decrease due to lack of charge of the toner.

If the average value A determined from the hardness distribution of measured values HU of universal hardness of the resin coat layer surface is smaller than 100 N/mm$^2$, the resin coat layer tends to be easily scraped to have a low wear resistance, tending to cause faulty images. If the average value A is larger than 800 N/mm$^2$, when applied to the developing apparatus of the type the developer layer thickness control member is elastically brought into pressure contact with the developing sleeve (via the toner) (i.e., a type of an elastic control blade), the surface of the elastic control blade tends to be rub-scratched at the initial stage of many-sheet running, and hence the toner coat tends to become non-uniform, tending to cause lines or non-uniformity in solid images to tend to result in a low image quality.

The average value A determined from the hardness distribution of the resin coat layer surface may preferably be within the range of $100 \leqq A \leqq 800$ (N/mm$^2$). In order to restrain the lowering of image quality over a longer period of time, the average value A may more preferably be within the range of $200 \leqq A \leqq 700$ (N/mm$^2$).

If the standard deviation a determined from the hardness distribution of measured values HU of universal hardness of the resin coat layer surface is 30 N/mm$^2$ or more, although the surface profile of the resin coat layer is made uniform at the initial stage of many-sheet running, the surface of the resin coat layer may come to wear selectively at its part having a small hardness, with progress of the many-sheet running, and hence the resin coat layer tends to come to have a large surface roughness. This may make the toner have a large coat level at the latter stage of many-sheet running, tending to cause fog or spots around character images especially in a low-temperature and low-humidity environment. Also, even in the case when the standard deviation σ is smaller than 30 N/mm$^2$, in the resin coat layer making use of the conventional graphite particles the resin coat layer may come to wear selectively at hill portions of the resin coat layer surface, and hence the resin coat layer tends to come to have a small surface roughness. Hence, the toner charge-up phenomenon and blotches tend to occur especially in a low-temperature and low-humidity environment, and the image density decrease and image deterioration such as lines or non-uniformity in solid images which are due to the lack of coat level of the toner tend to occur especially in a high-temperature and high-humidity environment. Also, such a resin coat layer tends to cause the melt adhesion of toner to the developing sleeve when a low-temperature fixable toner is used.

Next, in the present invention, the binder resin used in the resin coat layer may include phenolic resins, epoxy resins, polyamide resins, polyester resins, polycarbonate resins, polyolefin resins, silicone resins, fluorine resins, styrene resins, vinyl resins, cellulose resins, melamine resins, urea resins, polyurethane resins, polyimide resins and acrylic resins. Taking account of mechanical strength, thermosetting or photosetting resins are more preferred. However, thermoplastic resins may also be used as long as they are those having a sufficient mechanical strength.

In the present invention, the resin coat layer formed at the surface of the developing sleeve by using the above forming materials may preferably be conductive in order to keep the toner from clinging to the developing sleeve surface because of charge-up of the toner, or keep the toner from being faultily provided with charge from the developing sleeve surface, which may be caused by charge-up of the toner. The resin coat layer may preferably have, as volume resistivity, a value of $10^5$ Ω·cm or less, and more preferably 103 Ω·cm or less. If the resin coat layer of the developing sleeve surface has a volume resistivity of more than $10^5$ Ω·cm, the toner tends to be faultily provided with charge, consequently tending to cause the toner charge-up phenomenon and blotches.

In the present invention, in order to control the resistivity of the resin coat layer to the above value, any of conductive materials as enumerated below may be incorporated in the resin coat layer. As a conductive fine powder used in such a case, it may include, e.g., fine powders of metals such as aluminum, copper, nickel and silver; fine powders of metal oxides such as antimony oxide, indium oxide, tin oxide, titanium oxide, zinc oxide, molybdenum oxide and potassium titanate; carbon fibers; carbon black such as furnace black, lamp black, thermal black, acetylene black and channel black; fine powders of carbon materials such as graphite; and metal fibers. Of these, the carbon black, in particular, conductive amorphous carbon may preferably be used because it has good electric conductivity and can obtain certain arbitrary conductance by filling the resin with it to impart conductivity or by controlling the amount in which it is added. It can also improve dispersion stability required when a resin composition is made into a coating material.

In the present invention, in the case when any of these conductive fine powders is used, the conductive fine powder may preferably be added in an amount ranging from 1 to 100 parts by weight based on 100 parts by weight of the binder resin. If it is in an amount of less than 1 part by weight, the resistivity of the resin coat layer can not easily be lowered to the desired level, and also the toner tends to melt-adhere to the binder resin used in the resin coat layer of the developing sleeve. If it is in an amount of more than 100 parts by weight, the resin coat layer tends to have a low strength (wear resistance) especially when a fine powder having particle size on the order of submicrons is used.

In the present invention, a solid lubricant may be dispersed in the resin coat layer. Commonly known solid lubricants may be used. For example, the solid lubricant may include particles of graphite, molybdenum disulfide, boron nitride, mica, graphite fluoride, silver-niobium selenide, calcium chloride-graphite, talc, and fatty acid metal salts such as zinc stearate. In particular, graphite particles may particularly preferably be used because the conductivity of the resin coat layer is not damaged. The solid lubricant may preferably be added in an amount ranging from 1 to 100 parts by weight based on 100 parts by weight of the binder resin. If it is in an amount of less than 1 part by weight, the melt adhesion of toner to the binder resin surface of the resin coat layer may less effectively be remedied. If on the other hand it is in an amount of more than 100 parts by weight, the resin coat layer tends to have a low strength (wear resistance) especially when a fine powder having particle size on the order of submicrons is used.

As these solid lubricants, those having a volume-average particle diameter of preferably from 0.5 to 4.0 μm may be used. Solid lubricants having a volume-average particle diameter of less than 0.5 μm are undesirable because it is difficult to attain sufficient lubricating properties. Those having a volume-average particle diameter of more than 4.0 μm are undesirable in view of uniform triboelectric charging of the toner and strength of the resin coat layer, because they may greatly affect the surface profile of the resin coat layer to tend to make its surface properties non-uniform.

In the present invention, in order to make the toner have much stabler chargeability, a charge control agent may optionally be used in combination with the graphitized particles by its addition to the resin coat layer.

As negative-charging charge control agents, organic metal salts, organic metal complexes or chelate compounds are effective, which may include, e.g., monoazo metal complexes, acetylacetone metal complexes, metal complexes or metal salts of aromatic hydroxycarboxylic acids or aromatic dicarboxylic acids. Besides, they may include aromatic mono- or polycarboxylic acids and metal salts thereof, anhydrides thereof or esters thereof, and phenol derivatives such as bisphenol. Any of these may be used alone or in combination of two or more types.

As positive-charging charge control agents, they may include Nigrosine and modified products of Nigrosine, modified with a fatty acid metal salt; quaternary ammonium salts such as tributylbenzylammonium 1-hydroxy-4-naphthosulfonate and tetrabutylammonium teterafluoroborate; phosphonium salts such as tributyl benzylphosphonium-1-hydroxy-4-naphthosulfonate and tetrabutylphosphonium tetrafluoroborate, and lake pigments of these; triphenylmethane dyes and lake pigments of these (lake-forming agents may include tungstophosphoric acid, molybdophosphoric acid, tungstomolybdophosphoric acid, tannic acid, lauric acid, gallic acid, ferricyanides and ferrocyanides); metal salts of higher fatty acids; diorganotin oxides such as dibutyltin oxide, dioctyltin oxide and dicyclohexyltin oxide; and diorganotin borates such as dibutyltin borate, dioctyltin borate and dicyclohexyltin borate.

In the present invention, as charge control agents used for the purposes of improving the chargeability of negatively chargeable toners and restraining the chargeability of positively chargeable toners, preferably usable are nitrogen-containing heterocyclic compounds as disclosed in Japanese Patent Application Laid-Open No. H10-293454. As methods for controlling the chargeability of toners for the purposes of restraining the chargeability of negatively chargeable toners and improving the chargeability of positively chargeable toners, preferably usable are combinations of resins having a nitrogen-containing group with quaternary ammonium salt compounds as disclosed in Japanese Patent Applications Laid-Open No. H10-326040, No. H11-052711 and No. H11-249414.

In the present invention, spherical particles for forming unevenness on the resin coat layer surface (hereinafter "unevenness formative particles") may also be used in combination with the graphitized particles.

Such unevenness formative particles may include, e.g., resin particles of vinyl polymers such as polymethyl methacrylate, polyethyl acrylate, polybutadiene, polyethylene, polypropylene and polystyrene, or vinyl copolymers; resin particles of benzoguanamine resins, phenol resins, polyamide resins, fluorine resins, silicone resins, epoxy resins and polyester resins; particles of oxides such as alumina, zinc oxide, silica, titanium oxide and tin oxide; carbon particles; and conductive particles such as conductive-treated resin particles. It is also possible to use in the form of particles an organic compound such as a charge control agent described later.

Of these unevenness formative particles, as the resin particles, spherical resin particles may preferably be used which have been produced by suspension polymerization or dispersion polymerization. Here, the "spherical" refers to particles having a length/breadth ratio of from 1.0 to 1.5. It is preferable to use particles having a length/breadth ratio of from 1.0 to 1.2. It is more preferable to use truly spherical particles. Spherical resin particles can provide a preferable surface roughness by its addition in a smaller quantity, and makes it easy to obtain a more uniform surface profile. Such spherical resin particles may include particles of acrylic resins such as polyacrylate and polymethacrylate, particles of polyamide resins such as nylon, particles of polyolefin resins such as polyethylene and polypropylene, silicone resin particles, phenol resin particles, polyurethane resin particles, styrene resin particles, and benzoguanamine particles. Resin particles obtained by pulverization may also be used after they have been subjected to physical spherical treatment.

Where the unevenness formative particles are spherical, the area of contact with the developer layer thickness control member with which the particles are brought into pressure contact is made smaller. Hence, such particles are more preferred because an increase in sleeve rotational torque due to frictional force can be restrained and toner adhesion can be lessened.

Such spherical resin particles may also be used after an inorganic fine powder has been made to adhere or cling to their surfaces. The inorganic fine powder may include fine powders of oxides such as $SiO_2$, $SrTiO_3$, $CeO_2$, CrO, $Al_2O_3$, ZnO, MgO and $TiO_2$; nitrides such as $Si_3N_4$; carbides such as SiC; sulfates such as $CaSO_4$ and $BaSO_4$; and carbonates such as $CaCO_3$.

The inorganic fine powder may be used after it has been treated with a coupling agent. In order to improve its adherence to the binder resin, or in order to impart hydrophobicity to its particles, the coupling agent may preferably be used. Such a coupling agent may include a silane coupling agent, a titanium coupling agent and a zircoaluminate coupling agent. Stated more specifically, the silane coupling agent may include hexamethyldisilazane, trimethylsilane, trimethylchlorosilane, trimethylethoxysilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltri-chlorosilane, β-chloroethyltrichlorosilane, chloromethyldimethylchlorosilane, triorganosilyl mercaptan, trimethylsilyl mercaptan, triorganosilyl acrylate, vinyldimethylacetoxysilane, dimethyldiethoxysilane, dimethyldimethoxysilane, diphenyldiethoxysilane, hexamethyldisiloxane, 1,3-divinyltetramethyldisiloxane, 1,3-diphenyltetramethyldisiloxane, and a dimethylpolysiloxane having 2 to 12 siloxane units per molecule and containing a hydroxyl group bonded to each silicon atom in its units positioned at the terminals.

Such treatment with the inorganic fine powder in respect to the surfaces of the spherical resin particles enables improvements of dispersibility in coating materials, uniformity of coated surfaces, stain resistance of the resin coat layer surface, charge-providing properties to the toner, wear resistance of the coat layer, and so forth.

In order to more improve the stain resistance and wear resistance of the resin coat layer surface, it is more preferable to provide the unevenness formative particles with conductivity. As conductivity-provided spherical particles, they may include spherical particles conductive-treated by coating the surfaces of particles of a metal oxide such as titanium oxide, niobium oxide, manganese oxide or lead oxide, or particles of a pigment such as barium sulfate, with a good conductive material such as tin oxide; spherical particles endowed with conductivity by doping an insulating metal oxide such as zinc oxide, copper oxide or iridium oxide with a metal having a different oxidation number; and also conductive spherical particles disclosed in Japanese Patent Application Laid-Open No. H8-240981.

Such conductive spherical particles may preferably have a volume resistivity of $10^6$ Ω·cm or less, and more preferably from $10^{-3}$ to $10^6$ Ω·cm. If the conductive spherical particles have a volume resistivity of more than $10^6$ Ω·cm, spherical particles laid bare to the surface of the resin coat layer as a result of wear may serve as nuclei around which toner contamination and melt-adhesion tend to occur and also make it difficult to achieve rapid and uniform charging. Making the spherical particles endowed with conductivity makes it not easy for the charge to be accumulated on the surfaces of the spherical particles, and enables reduction of toner adhesion and improvement of charge-providing properties to the toner.

The unevenness formative particles to be added may have a true density of 3 g/cm$^3$ or less. If the unevenness formative particles have a true density of more than 3 g/cm$^3$, they tend to be dispersed in a non-uniform state when a coating material for forming the resin coat layer is prepared, and therefore the state of dispersion of the unevenness formative particles in the resin coat layer tends to be non-uniform. Hence, this may make it difficult to impart a uniform roughness to the surface of the resin coat layer, may make charge-providing properties and resin coat layer strength insufficient, and also may makes the stain resistance and wear resistance unable to be exhibited that are advantages the unevenness formative particles can bring.

The unevenness formative particles may include spherical carbon particles, spherical resin particles surface-treated with a conductive material, and spherical resin particles in which conductive particles have been dispersed.

The unevenness formative particles may preferably have a particle diameter of from 0.5 μm to 4.0 μm in volume-average particle diameter. If they have a volume-average particle diameter of less than 0.5 μm, it may be difficult to form uniform surface unevenness, and, in an attempt to make the surface roughness large, they must be added in an excessive quantity, so that the resin coat layer tends to be brittle to have a low wear resistance. If on the other hand they have a volume-average particle diameter of more than 4.0 μm, the unevenness formative particles may excessively protrude from the resin coat layer surface. Hence, the toner coat layer may have an excessively large thickness to make the toner low charged, or the surface roughness may become large with progress of many-sheet running, resulting in changes in the toner coat level.

In the present invention, the resin coat layer may be formed by coating on a substrate described later a coating material prepared by dispersing and mixing the respective components in a solvent. To disperse and mix the respective components, a known dispersion machine that utilizes beads may preferably be used, as exemplified by a sand mill, a paint shaker, a Daino mill or a pearl mill. The coating material may be coated by dipping, spraying or roll coating.

The resin coat layer may preferably have a layer thickness of 25 μm or less, more preferably 20 μm or less, and still more preferably from 4 μm to 20 μm. Such a thickness is preferable for obtaining a uniform layer thickness.

In the present invention, as the substrate of the developing sleeve having the resin coat layer, a metal, an alloy thereof or a compound thereof may preferably be used. In particular, one obtained by molding stainless steel, or aluminum or an alloy thereof, in a cylindrical shape may preferably be used. In particular, aluminum is preferred because it has a good workability. For example, in the case of a cylindrical substrate, aluminum is particularly preferred because the substrate can be free of run-out in the axial direction, and can be improved in roundness in the peripheral direction and mechanical precision. The surfaces of these substrates may further be treated by blasting, filing or cutting so as to have a stated surface roughness, or may also be treated by electrolytic plating or electroless plating.

In the present invention, as the substrate of the developing sleeve having the resin coat layer, it may also be one comprising a stainless-steel mandrel and provided on its periphery an elastic layer. As the elastic layer provided on the periphery of the mandrel, one obtained by molding a rubber such as silicone rubber or urethane rubber may preferably be used. Particularly preferred is one further incorporated with a conducting agent for controlling electrical resistance. The elastic layer may preferably be one having a stated hardness and a stated surface roughness in order to improve the adherence of the resin coat layer serving as the surface layer. An intermediate layer may further be provided on the surface of the elastic layer, and the resin coat layer may be formed on the intermediate layer. Also, the surface of the mandrel-shaped substrate may be treated by blasting, filing or cutting so as to have a stated surface roughness. The surface of the mandrel-shaped substrate may also be treated by electrolytic plating or electroless plating.

The developing apparatus making use of the developing sleeve having the resin coat layer is described below in detail.

Figure 4:
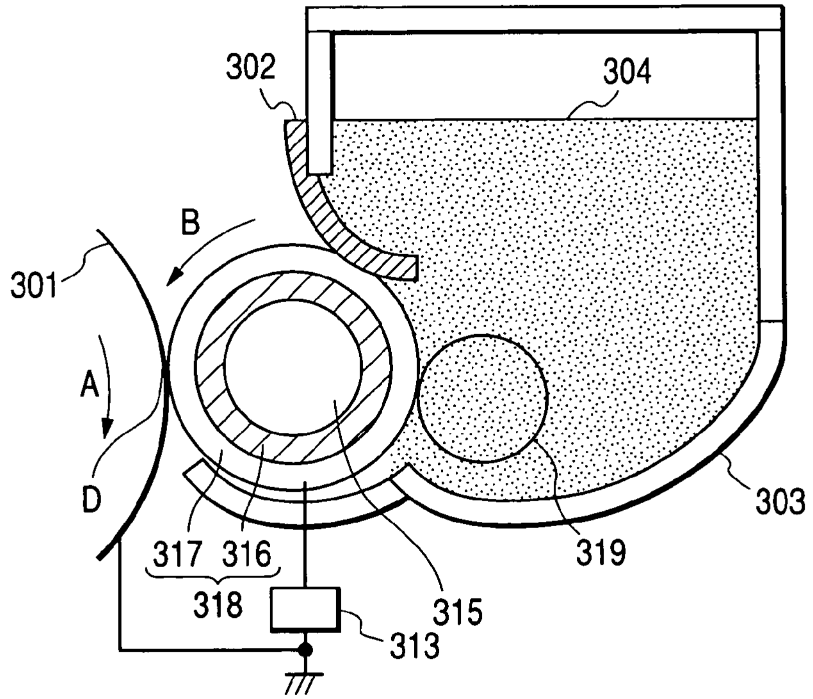
FIG. 4 is a diagrammatic view showing still another example of the developing apparatus of the present invention.

The developing apparatus may include developing apparatus illustrated diagrammatically in FIGS. 2 to 4. In those shown in FIGS. 2 and 3, an electrostatic latent image bearing member (e.g., a photosensitive drum) 301 holding an electrostatic latent image formed by a known process is rotated in the direction of an arrow A. A developing sleeve 308 as the developer carrying member carries a one-component type developer 304 having a magnetic toner, held in a developer container 303, and is rotated in the direction of an arrow B. Thus, the developer 304 is transported to a developing zone D where the developing sleeve 308 and the photosensitive drum 301 face each other. As shown in FIGS. 2 and 3, the developing sleeve 308 has a resin coat layer 307 formed on a metallic cylinder 306 serving as the substrate. Inside the developing sleeve 308, a magnet roller 305 is provided so that the developer 304 is magnetically attracted and held onto the developing sleeve 308. The magnet roller 305 is set stationary. The developing sleeve 308 and the magnet roller 305 stands non-contact.

The developer container 303 is provided therein with agitating blades 309 and 310, and 314 (FIG. 3), which agitates the developer 304 by their rotation in the direction of arrows C, a screw 311 which feeds the developer 304 into the developer container 303, and an agitation wall 312 which controls the quantity of the developer in the developer container 303.

The developer 304 gains triboelectric charges that enable development of the electrostatic latent image formed on the photosensitive drum 301, as a result of the friction between the particles themselves of the magnetic toner and between the toner particles and the resin coat layer 307 on the developing sleeve 308. In the example shown in FIG. 3, in order to control the layer thickness of the developer 304 transported to the developing zone D, an elastic control blade 302 is used as the developer layer thickness control member, which is formed of an elastic plate made of a material having a rubber elasticity, such as urethane rubber or silicone rubber, or a material having a metal elasticity, such as bronze or stainless steel. This elastic control blade 302 is brought into pressure contact with the developing sleeve 308 in a posture reverse to the latter's rotational direction, thus a thin layer of the developer 304 is formed on the developing sleeve 308. As the elastic control blade 302, in order to stably control the layer thickness and stably impart (negative) charge to the toner, it is preferable to use one having a structure wherein a polyamide elastomer (PAE) is stuck to the surface of a phosphor bronze plate, which can attain a stable pressure. The polyamide elastomer (PAE) may include, e.g., copolymers of polyamides with polyethers.

The developer layer thickness control member 302 may be in contact with the developing sleeve 308 at a pressure of from 5 to 50 N/m as a linear pressure. This is preferable in view of stable control of the developer and preferable developer layer thickness.

If the developer layer-thickness control member 302 is in contact at a linear pressure of less than 5 N/m, the developer control may be so weak as to cause fog or toner leak. If it is in contact at a linear pressure of more than 50 N/m, the toner tends to be greatly damaged to tend to cause deterioration of toner or melt-adhesion of toner to the sleeve and the elastic control blade.

In the present invention, in place of the elastic control blade, as shown in FIG. 2 a magnetic control blade 302 made of a ferromagnetic metal may be set to extend downwards from the developer container 303 in such a way that it faces on the developing sleeve 308, leaving a gap width of about 50 to 500 μm from the surface of the developing sleeve 308 so that the magnetic line of force exerted from the pole N of the magnet roller 305 is converged to the magnetic control blade 302 to thereby form on the developing sleeve 308 a thin layer of the developer 304.

The thickness of the thin layer of the developer 304, thus formed on the developing sleeve 308, may preferably be much smaller than the minimum gap between the developing sleeve 308 and the photosensitive drum 301 in the developing zone D.

It is especially effective for the developing sleeve of the present invention to be set in a developing apparatus of the type the electrostatic latent image is developed through such a developer thin layer (e.g., a non-contact type developing apparatus). The developer carrying member of the present invention may also be applied in a developing apparatus of the type the thickness of the developer layer is larger than the minimum gap between the developing sleeve 308 and the photosensitive drum 301 in the developing zone D (i.e., a contact type developing apparatus).

In the developing apparatus shown in FIG. 4, an electrostatic latent image bearing member (e.g., a photosensitive drum) 301 holding an electrostatic latent image formed by a known process is rotated in the direction of an arrow A. A developing roller 318 as the developer carrying member carries a one-component type developer 304 formed of a non-magnetic toner, held in a developer container 303, and is rotated in the direction of an arrow B. Thus, the developer 304 is transported to a developing zone D where the developing roller 318 and the photosensitive drum 301 are kept in contact with each other. As shown in FIG. 4, the developing roller 318 has an elastic layer 316 and a surface layer 317 (the resin coat layer described above) which are formed on a metallic support 315 serving as the substrate.

The developer 304 gains triboelectric charges that enable development of the electrostatic latent image formed on the photosensitive drum 301, as a result of the friction between the particles themselves of the non-magnetic toner and between the toner particles and the surface layer (resin coat layer) 317 of the developing roller 318 surface. In the example shown in FIG. 4, in order to control the layer thickness of the developer 304 transported to the developing zone D, the same developer layer thickness control member 302 as that shown in FIG. 3 is used. Further, as shown in FIG. 4, a developer feed/stripping roller 319 is used which is to feed the developer to the developing roller 318 surface and/or to strip off the developer present on the developing roller 318 surface.

In the case when a developer feed/stripping roller 319 formed of an elastic roller is used as the developer feed/stripping roller 319 and when the surface is moved in the counter direction, the developer feed/stripping roller 319 may preferably be rotated at a peripheral speed of from 20% to 120%, and more preferably from 30% to 100%, with respect to the peripheral speed of the developing roller 318 regarded as 100%.

If the developer feed/stripping roller 319 is rotated at a peripheral speed of less than 20%, the developer may be fed insufficiently, so that follow-up performance for solid images may lower to cause ghost images. If it is rotated at a peripheral speed of more than 120%, the developer may be fed in a large quantity, so that the developer layer thickness may poorly be controlled or the charge quantity may be insufficient to cause fog. Moreover, the toner tends to be damaged to tend to cause fog or toner-melt adhesion due to deterioration of toner.

Where the developer feed/stripping roller 319 is rotated in the same (regular) direction as the rotation of the developing roller 318 surface, the developer feed/stripping roller 319 may preferably be rotated at a peripheral speed of from 100% to 300%, and more preferably from 101% to 200%, with respect to the peripheral speed of the developing roller 318, in view of the above toner feed quantity.

In view of stripping performance and feed performance, the developer feed/stripping roller 319 may more preferably be rotated in the counter direction of the surface movement of the developing roller 318.

The developer feed/stripping roller 319 may have a penetration to the developing roller 318, of from 0.5 mm to 2.5 mm. This is preferable in view of the feed performance and stripping performance of the developer.

If the developer feed/stripping roller 319 has a penetration of less than 0.5 mm, ghost tends to occur because of insufficient stripping. If it has a penetration of more than 2.5 mm, the toner may greatly be damaged, so that the toner may deteriorate to tend to cause melt-adhesion or fog.

In the following description, an example of the non-contact developing assembly is described with reference to FIG. 3.

In order to cause to fly the one-component developer 304 having a magnetic toner, carried on the developing sleeve 308, a development bias voltage is applied to the developing sleeve 308 through a development bias power source 313 as a bias means. When a DC voltage is used as the development bias voltage, a voltage having a value intermediate between the potential at electrostatic latent image areas (the region where a toner image is formed upon attraction of the developer 304) and the potential at back ground areas may preferably be applied to the developing sleeve 308.

In order to enhance the density of developed images or improve the gradation thereof, an alternating bias voltage may be applied to the developing sleeve 308 to form in the developing zone D a vibrating electric field whose direction reverses alternately. In such an instance, an alternating bias voltage formed by superimposing the above DC voltage component having a value intermediate between the potential at image areas to be developed and the potential at back ground areas may preferably be applied to the developing sleeve 308.

In the case of what is called regular development, where the toner is attracted to high-potential areas of an electrostatic latent image having high-potential areas and low-potential areas, a toner chargeable to a polarity reverse to the polarity of the electrostatic latent image is used. In the case of what is called reverse development, where the toner is attracted to low-potential areas of the electrostatic latent image having high-potential areas and low-potential areas, a toner chargeable to the same polarity as the polarity of the electrostatic latent image is used. The high-potential and low-potential are expressions in terms of the absolute values. In either case, the developer 304 is charged upon its friction with the developing sleeve 308.

FIGS. 2 to 4 exemplify the developing apparatus of the present invention diagrammatically. The shape of the developer container 303, the presence of the agitating blades 309 and 310 and the disposition of magnet poles may have various forms. These apparatus may also be use in development making use of a two-component developer containing a toner and a carrier.

Figure 5:
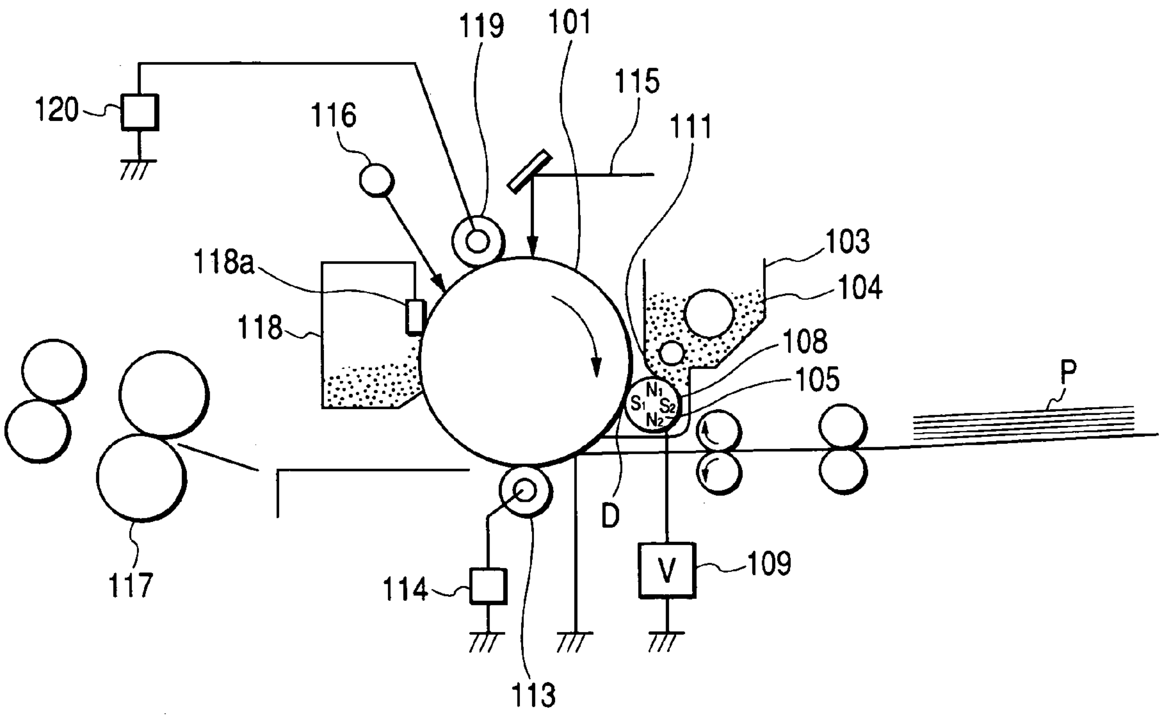
FIG. 5 is a diagrammatic view showing an image forming apparatus used in the present invention.

An example of the image forming apparatus of the present invention which employs any of the developing apparatus exemplified in FIGS. 2 to 4 is described below with reference to FIG. 5.

The surface of a photosensitive drum 101 as the electrostatic latent image bearing member is negatively charged by a contact (roller) charging means 119 as a primary charging means, and exposed to laser light 115 to form on the photosensitive drum 101 a digital latent image by image scanning. Then, the digital latent image thus formed is developed by reversal development using a one-component developer 104 having a non-magnetic toner, held in a hopper 103, and by means of a developing apparatus having an elastic control blade 111 as the developer layer thickness control member and equipped with a developing sleeve 108 as a developer carrying member provided internally with a multiple-pole permanent magnet 105. As shown in FIG. 5, in a developing zone D, a conductive substrate of the photosensitive drum 101 is earthed, and an alternating bias, a pulse bias and/or a DC bias is/are applied to the developing sleeve 308 through a bias applying means 109. Then, a recording medium P such as paper is come transported to a transfer zone, where the recording medium P is electrostatically charged by a contact (roller) transfer means 113 serving as a transfer means, on its back surface (the surface opposite to the photosensitive drum side) through a voltage applying means 114, so that the developed image (toner image) kept formed on the surface of the photosensitive drum 101 is transferred onto the recording medium P through the contact transfer means 113. Next, the recording medium P separated from the photosensitive drum 101 is transported to a heat-and-pressure roller fixing assembly 117 serving as a fixing means, and the toner image on the recording medium P is fixing-treated by means of the fixing assembly 117.

The one-component developer 104 remaining on the photosensitive drum 101 after the step of transfer is removed by a cleaning means 118 having a cleaning blade 118*a*. When the remaining one-component developer 104 is in a small quantity, the cleaning step may be omitted. After the cleaning, the surface of the photosensitive drum 101 is optionally subjected to charge elimination by erase exposure 116, and thus the above procedure again starting from the charging step using the contact (roller) charging means 119 as the primary charging means is repeated.

In a series of the above steps, the photosensitive drum (i.e., the latent image bearing member) 101 has a photosensitive layer and a conductive substrate, and is rotated in the direction of an arrow. In the developing zone D, the developing sleeve 108 formed of a non-magnetic cylinder, which is the developer carrying member, is rotated so as to move in the same direction as the surface movement of the photosensitive drum 101. Inside the developing sleeve 108, a multi-polar permanent magnet (magnet roll) 105 serving as a magnetic field generating means is provided in an unrotatable state. The one-component type developer 104 held in the developer container 103 is coated on the surface of the developing sleeve 108, and triboelectric charges (e.g., negative triboelectric charges) are imparted to the magnetic toner as a result of the friction between its toner particles and the surface of the developing sleeve 108 and between particles themselves of the magnetic toner. An elastic control blade 111 is further disposed so as to press the developing sleeve 108 elastically. Thus, the thickness of developer layer is controlled to be small (30 μm to 300 μm) and uniform so that a developer layer with a thickness smaller than the gap between the photosensitive drum 101 and the developing sleeve 108 in the developing zone is formed. The rotational speed of the developing sleeve 108 is controlled so that the peripheral speed of the developing sleeve 108 can be substantially equal or close to the peripheral speed of the photosensitive drum 101. In the developing zone D, an AC bias or a pulse bias may be applied as development bias voltage, to the developing sleeve 108 through a bias application means 109. This AC bias may have a frequency (f) of 200 to 4,000 Hz and a Vpp (peak-to-peak voltage) of 500 to 3,000 V.

When the developer (magnetic toner) is moved in the developing zone D, the magnetic toner moves to the electrostatic latent image side by the electrostatic force of the surface of the photosensitive drum 101 and the action of the development bias voltage such as AC bias or pulse bias.

In place of the elastic control blade 111, it is also possible to use a magnetic doctor blade made of a material such as iron. As the primary charging means, the charging roller 119 is used as the contact charging means in the above description. It may also be a contact charging means such as a charging blade or a charging brush. It may still also be a non-contact corona charging means. However, the contact charging means is preferred in view of less ozone caused by charging. As the transfer means, a contact charging means such as the transfer roller 113 is used in the above description. It may also be a non-contact corona transfer means. However, the contact transfer means is preferred in view of less ozone caused by charging.

The toner used in the developing apparatus of the present invention is described below. Toner is prepared from a fine powder obtained by melt-kneading a binder resin, a release agent, a charge control agent, a colorant and so forth, cooling the kneaded product to solidify, followed by pulverization, and classifying the pulverized product to make particle size distribution uniform. As the binder resin used in the toner, any known binder resin may be used.

For example, it may include a homopolymer of styrene; styrene derivatives such as α-methylstyrene and p-chlorostyrene; styrene copolymers such as a styrene-propylene copolymer, a styrene-vinyltoluene copolymer, a styrene-ethyl acrylate copolymer, a styrene-butyl acrylate copolymer, a styrene-octyl acrylate copolymer, a styrene-dimethylaminoethyl copolymer, a styrene-methyl methacrylate copolymer, a styrene-ethyl methacrylate copolymer, a styrene-butyl methacrylate copolymer, a styrene-dimethylaminoethyl methacrylate copolymer, a styrene-methyl vinyl ether copolymer, a styrene-methyl vinyl ketone copolymer, a styrene-butadiene copolymer, a styrene-isoprene copolymer, a styrene-maleic acid copolymer, and a styrene-maleic acid ester copolymer; polymethyl methacrylate, polybutyl methacrylate, polyvinyl acetate, polyethylene, polypropylene, polyvinyl butyral, polyacrylic resins, rosin, modified rosins, terpene resins, phenol resins, aliphatic or alicyclic hydrocarbon resins, aromatic petroleum resins, paraffin wax, and carnauba wax. Any of these may be used alone or in the form of a mixture.

The colorant used in the toner may include carbon black, Nigrosine dyes, lamp black, Sudan Black SM, Fast Yellow G, Benzidine Yellow, Pigment Yellow, Indian First Orange, Irgazine Red, Para Nitraniline Red, Toluidine Red, Carmine 6B, Permanent Bordeaux FRR, Pigment Orange R, Lithol Red 2G, Lake Red 2G, Rhodamine FB, Rhodamine B Lake, Methyl Violet B lake, Phthalocyanine Blue, Pigment Blue, Brilliant Green B, Phthalocyanine Green, Oil Yellow GG, Zapon First Yellow CGG, Kayaset Y963, Kayaset YG, Zapon First Orange RR, Oil Scarlet, Aurazole Brown B, Zapon First Scarlet CG, and Oil Pink OP.

Where the toner is a magnetic toner, a magnetic powder is incorporated in the toner particles. As the magnetic powder, a material magnetizable when placed in a magnetic field is used. The magnetic powder may include powders of ferromagnetic metals such as iron, cobalt and nickel; powders of magnetic oxides such as magnetite, hematite and ferrite; and powders of alloys of any of iron, cobalt and nickel. The magnetic powder may preferably be in a content of from 15 to 70% by weight based on the weight of the toner.

For the purposes of improving releasability at the time of fixing and improving fixing performance, the toner may be incorporated with a wax. The wax may include paraffin wax and derivatives thereof, microcrystalline wax and derivatives thereof, Fischer-Tropsch wax and derivatives thereof, polyolefin wax and derivatives thereof, and carnauba wax and derivatives thereof. The derivatives may include oxides, block copolymers with vinyl monomers, and graft modified products. Besides, the wax may include long-chain alkyl alcohols, fatty acids having long-chain alkyl groups, acid amides having long-chain alkyl groups, esters having long-chain alkyl groups, ketones having long-chain alkyl groups, hardened caster oil and derivatives thereof, vegetable waxes, animal waxes, mineral waxes, and petrolatum.

A charge control agent may optionally be incorporated in the toner. The charge control agent includes negative charge control agents and positive charge control agents. For example, as those capable of controlling the toner to be negatively chargeable, organic metal complexes or chelate compounds are available, which may include monoazo metal complexes, acetylacetone metal complexes, metal complexes of aromatic hydroxycarboxylic acids or aromatic dicarboxylic acids. Besides, they may include aromatic hydroxycarboxylic acids, aromatic mono- or polycarboxylic acids and metal salts, anhydrides or esters thereof, and phenol derivatives such as bisphenol. Also, those capable of controlling the toner to be positively chargeable may include Nigrosine and modified products of Nigrosine, modified with a fatty acid metal salt; quaternary ammonium salts such as tributylbenzylammonium 1-hydroxy-4-naphthosulfonate and tetrabutylammonium teterafluoroborate; phosphonium salts such as tributyl benzylphosphonium-1-hydroxy-4-naphthosulfonate and tetrabutylphosphonium tetrafluoroborate, and lake pigments of these (lake-forming agents may include tungstophosphoric acid, molybdophosphoric acid, tungstomolybdophosphoric acid, tannic acid, lauric acid, gallic acid, ferricyanides and ferrocyanides); metal salts of higher fatty acids; guanidine compounds, and imidazole compounds.

For the purpose of improving fluidity, powder such as an inorganic fine powder may optionally externally be added to the toner to be used. Such an inorganic fine powder may include fine silica powder; fine powders of metal oxides such as alumina, titania, germanium oxide and zirconium oxide; fine powders of carbides such as silicon carbide and titanium carbide; and fine powders of nitrides such as silicon nitride and germanium nitride. These inorganic fine powders may be subjected to organic treatment with an organosilicon compound or a titanium coupling agent. The organosilicon compound hexamethyldisilazane, trimethylsilane, trimethylchlorosilane, trimethylethoxysilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triornanosilyl mercaptan, trimethylsilyl mercaptan, triornanosilyl acrylate, vinyldimethylacetoxysilane, dimethylethoxysilane, dimethyldimethoxysilane, diphenyldiethoxysilane, hexamethyldisiloxane, 1,3-divinyltetramethyldisiloxane, 1,3-diphenyltetramethyldisiloxane, and a dimethylpolysiloxane having 2 to 12 siloxane units per molecule and containing a hydroxyl group bonded to each Si in its units positioned at the terminals.

Also usable are those obtained by treating untreated fine powders with a nitrogen-containing silane coupling agent. Especially in the case of positive toners, those having been treated with the nitrogen-containing silane coupling agent are preferred. The nitrogen-containing silane coupling agent may include aminopropyltrimethoxysilane, aminopropyltriethoxysilane, dimethylaminopropyltrimethoxysilane, dimethylaminopropylmethyldiethoxysilane, diethylaminopropyltrimethoxysilane, dipropylaminopropyltrimethoxysilane, dibutylaminopropyltrimethoxysilane, monobutylaminopropyltrimethoxysilane, dioctylaminopropyltrimethoxysilane, dibutylaminopropyldimethoxysilane, dibutylaminopropylmonomethoxysilane, dimethylaminophenyltriethoxysilane, trimethoxylsilyl-γ-propylphenylamine, trimethoxylsilyl-γ-propylbenzylamine, trimethoxylsilyl-γ-propylpiperidine, trimethoxylsilyl-γ-propylmorpholine, and trimethoxylsilyl-γ-propylimidazole.

The inorganic fine powder may be treated with the above silane coupling agent by a method including 1) spraying, 2) organic solvent treatment and 2) aqueous solution treatment. The treatment by spraying is commonly a method in which the inorganic fine powder is agitated and an aqueous solution or solvent solution of the coupling agent is sprayed on the powder being agitated, followed by drying at about 120° C. to 130° C. to remove the water or solvent. Also, the treatment by the organic solvent treatment is a method in which the coupling agent is dissolved in an organic solvent (e.g., alcohol, benzene, halogenated hydrocarbons) containing a hydrolysis catalyst together with a small quantity of water, and the inorganic fine powder is immersed in the resultant solution, followed by filtration or pressing to effect solid-liquid separation and then drying at about 120° C. to 130° C. The aqueous solution treatment is a method in which about 0.5% of the coupling agent is hydrolyzed in water or in a water-solvent mixture with a stated pH and the inorganic fine powder is immersed in the resultant hydrolyzate, similarly followed by solid-liquid separation and then drying.

As other organic treatment, a fine powder treated with a silicone oil may also be used. As a preferred silicone oil, a silicone oil having a viscosity at 25° C. of from about 0.5 to 10,000 $mm^2/s$, and preferably from 1 to 1,000 $mm^2/s$, may be used. It may include, e.g., methylhydrogensilicone oil, dimethylsilicone oil, phenylmethylsilicone oil, chlorophenylmethylsilicone oil, alkyl-modified silicone oil, fatty-acid-modified silicone oil, polyoxyalkylene-modified silicone oil and fluorine-modified silicone oil. A silicone oil having a nitrogen atom in the side chain may also be used. Especially in the case of positive toners, it is preferable to use the silicone oil having a nitrogen atom in the side chain.

The treatment with silicone oil may be carried out in the following way. The inorganic fine powder is vigorously agitated with heating, and the above silicone oil or its solution is sprayed, or vaporized and then sprayed, or the inorganic fine powder is made into a slurry and the silicone oil or its solution is dropwise added thereto while stirring the slurry. Any of these silicone oils may be used alone or in the form of a mixture, or in combination, of two or more, or after their multiple treatment. This treatment may also be carried out in combination with treatment with the silane coupling agent.

The toner particles may be used after they have been subjected to spherical treatment or surface-smoothing treatment. This is preferable because its transfer performance is improved. Such a method may include a method in which, using an apparatus having an agitation element or blade and a liner or casing, toner particles are made to pass through a micro-gap between the blade and the liner, where the surfaces of toner particles are made smooth, or toner particles are made spherical, by a mechanical force; a method in which toner particles are suspended in hot water to make them spherical; and a method in which toner particles are exposed to a hot-air stream to make them spherical. Also, a method for making spherical toner particles directly may include a method in which a mixture composed chiefly of monomers for forming the binder resin of toner particles is suspended in an aqueous medium and the monomer is polymerized to prepare toner particles. A commonly available method is a method in which a polymerizable monomer, a colorant, a polymerization initiator, and optionally a cross-linking agent, a charge control agent, a release agent and other additives are uniformly dissolved or dispersed to prepare a monomer composition, and thereafter this monomer composition is dispersed by means of a suitable stirrer in an aqueous medium containing a dispersion stabilizer, to have a proper particle diameter, where polymerization reaction is further carried out to obtain toner particles having the desired particle diameter.

The toner may be blended with a carrier so as to be used as a two-component developer.

The carrier may include particles of iron type oxides such as hematite, magnetite, manganese-zinc type ferrite, nickel-zinc type ferrite, manganese-magnesium type ferrite, lithium type ferrite and copper-zinc type ferrite, mixtures of any of these, and resin powders containing a magnetic material. The carrier to be used may have an average particle diameter of from 20 μm to 200 μm, preferably 20 μm to 80 μm.

For such a carrier, any of the above particulate matter may directly be used as carrier particles. In order to control triboelectric charges of the toner or prevent toner-spent to the carrier, a carrier may also be used the particle surfaces of which have been coated with resin using a coating agent such as silicone resin, fluorine resin, acrylic resin or phenolic resin.

Methods for measuring physical properties concerning the present invention are described below.

—Measuring Methods—

(1) Degree of Graphitization P (002) of Graphitized Particles:

The degree of graphitization p (002) may be known by measuring the lattice spacing d (002) obtained from an X-ray diffraction spectrum of graphite, and is found by d (002) $=3.440-0.086\ (1-p\ (002)^2)$.

The lattice spacing d (002) is determined by X-ray diffraction using CuKα as an X-ray source, where CuKβ rays are kept removed using a nickel filter. High-purity silicon is used as the standard substance. The lattice spacing d (002) is calculated from peak positions of C (002) and Si (111) diffraction patterns. Chief measuring conditions are as follows:

X-ray generator: 18 kw.
Goniometer: Horizontal goniometer.
Monochrometer: Used.
Tube voltage: 30.0 kV.
Tube current: 10.0 mA.
Measuring method: Continuous method.
Scanning axis: 2θ/θ.
Sampling interval: 0.020 deg.
Scanning speed: 6.000 deg/min.
Divergence slit: 0.50 deg.
Scatter slit: 0.50 deg.

Receiving slit: 0.30 mm (2) Measurement of Surface Roughness of Resin Coat Layer Surface:

The arithmetic-mean roughness Ra of the resin coat layer surface is measured according to JIS B 0601 "Surface Roughness," using, e.g., SURFCORDER SE-3500, manufactured by Kosaka Laboratory, Ltd. It is measured under conditions of a cut-off of 0.8 mm, an evaluation length of 4 mm and a feed rate of 0.5 mm/s, and is measured at (3 spots in axial direction)×(3 spots in peripheral direction)=9 spots each, where their average value is found.

(3) Measurement of Hardness of Resin Coat Layer Surface:

The hardness of the resin coat layer surface is a hardness value obtained from a surface physical-property test conducted using, e.g., FISCHER SCOPE H100V, manufactured by Fischer Instruments K.K. In the measurement, a quadrangular pyramidal diamond indenter whose angle between the opposite surfaces is defined to be 136° is used, and this is indented on into the film under stepwise application of a measurement load, where the depth of indentation in the state the load is applied is electrically detected and read. The value of hardness is displayed in the percentage found when a test load is divided by the surface area of a dent produced by the test load. The universal hardness value HU is represented by the value of hardness at the maximum indentation depth of the indenter, as shown by the following expression (1):

$$\text{Universal hardness value } HU=K\times F/h^2 (\text{N/mm}^2) \quad (1)$$

where K represents a constant (1/26.43), F represents a test load (N), and h represents the maximum indentation depth (mm) of the indenter.

The value of hardness is measurable at a load very smaller than any other hardness measurement, and also hardness inclusive of elastic deformation and plastic deformation levels is obtainable also in regard to materials having elasticity and plasticity. Hence, this value is preferably used.

As the sample prepared for the measurement of hardness, a sample is used in which the resin coat layer has been formed on the surface of a substrate. In regard to the surface of the resin coat layer, a smoother sample brings more improvement in measurement precision. Accordingly, it is more preferable to make measurement after the sample has been subjected to smoothing by polishing. In the present invention, the surface of the resin coat layer is subjected to polishing with use of a #2000 polishing tape, and the surface roughness Ra is so set as to be 0.2 or less after the polishing.

The test load and the maximum indentation depth of the indenter may preferably be made to be in a range to such an extent that they are not affected by the surface roughness of the resin coat layer and also not affected by the underlying substrate. In the present invention, the surface roughness is measured so applying the test load that the maximum indentation depth of the indenter comes to 1 to 2 μm. Also, it is measured in an environment of a temperature of 23° C. and a humidity of 50% RH, and is measured 100 times at different measurement spots, where the average value found from the resultant hardness distribution is represented by A, and its standard deviation by a.

(4) Measurement of Volume Resistivity of Resin Coat Layer:

A conductive resin coat layer is formed in a thickness of 7 to 20 μm on a PET sheet of 100 μm in thickness, and its volume resistivity is measured with, e.g., a resistivity meter LORESTAR AP or HIRESTAR AP (both manufactured by Mitsubishi Chemical Corporation), using a four-terminal probe. The measurement is made in an environment of a temperature of 20 to 25° C. and a humidity of 50 to 60% RH.

(5) Measurement of Particle Diameter of Conductive Material:

Measured using a Coulter Model LS-230 particle size distribution meter (manufactured by Coulter Electronics Inc.), which is a laser diffraction particle size distribution meter. As a measuring method, an aqueous module is used. As a measuring solvent, pure water is used. The inside of a measuring system of the particle size distribution meter is washed with the pure water for about 5 minutes, and 10 to 25 mg of sodium sulfite as an anti-foaming agent is added to the measuring system to carry out background function.

Next, three or four drops of a surface active agent are added in 10 ml of pure water, and 5 to 25 mg of a measuring sample is further added. The aqueous solution in which the sample has been suspended is subjected to dispersion by means of an ultrasonic dispersion machine for about 1 to 3 minutes to obtain a sample fluid. The sample fluid is little by little added in the measuring system of the above measuring device, and the sample concentration in the measuring system is adjusted so as to be 45 to 55% as PIDS on the screen of the device to make measurement. Then, volume average particle diameter calculated from volume distribution is determined.

(6) Measurement of True Density of Unevenness Formative Particles:

True density of the unevenness formative particles used in the present invention is measured with a dry densitometer ACCUPYC 1330 (manufactured by Shimadzu Corporation).

(7) Measurement of Volume Resistivity of Unevenness Formative Particles:

A sample is put in an aluminum ring of 40 mm diameter, and then press-molded under 2,500 N to measure the volume resistivity of the molded product, using, e.g., a resistivity meter LORESTAR AP or HIRESTAR AP (both manufactured by Mitsubishi Chemical Corporation), using a four-terminal probe. The measurement is made in an environment of a temperature of 20 to 25° C. and a humidity of 50 to 60% RH.

(8) Measurement of Scrape of resin Coat Layer:

Outer diameter of the sleeve is measured before and after running, using, e.g., a laser measuring device (manufactured by KEYENCE CORPORATION; controller: LS-5500; sensor head: LS-5040T). An average value at 60 spots is found from the measurements obtained before and after that, and is regarded as depth of scrape (μm).

(9) Measurement of Particle Diameter of Toner and Resin Particles:

To 100 to 150 ml of an electrolytic solution, 0.1 to 5 ml of a surface active agent (alkylbenzene sulfonate) is added, and 2 to 20 mg of a sample to be measured is added thereto. The electrolytic solution in which the sample has been suspended is subjected to dispersion for about 1 minute to about 3 minutes by means of an ultrasonic dispersion machine. Particle size distribution of particles of 0.3 to 40 μm in diameter is measured on the basis of volume, by means of Coulter Counter Multisizer, using an aperture of 17 μm or 100 μm adapted appropriately to particle size. Number-average particle diameter and weight-average particle diameter are determined by computer processing from data of measurement made under these conditions. Further, the cumulative proportion in cumulative distribution of diameter ½ time or less the number-average particle diameter is calculated from number-based particle size distribution to determine the cumulative value of diameter ½ time or less the number-average particle diameter. Similarly, the cumulative proportion in cumulative distribution of diameter twice or more the weight-average particle diameter is calculated from volume-based particle size distribution to determine the cumulative value of diameter twice or more the weight-average particle diameter.

EXAMPLES

The present invention is described below in greater detail by giving specific examples. In the following, "part(s)" refers to "part(s) by weight," and "%," "% by weight."

Graphitized Particles

Production Example 1

Graphitized particles were prepared which were to be used in the resin coat layer formed at the developing sleeve surface. To obtain the graphitized particles, β-resin was extracted from coal-tar pitch by solvent fractionation and the β-resin was hydrogenated to carry out heavy-duty treatment. Thereafter, the solvent-soluble matter was removed with toluene to obtain a bulk of mesophase pitch. The bulky mesophase pitch was finely pulverized, and the resultant mesophase pitch particles were subjected to oxidation treatment at about 300° C. in air, followed by firing at 3,000° C. in an atmosphere of nitrogen to effect graphitization, and further followed by classification to obtain graphitized particles with a volume-average particle diameter of 2.4 μm, which were designated as Graphitized Particles a-1. Physical properties of Graphitized Particles a-1 are shown in Table 1.

Graphitized Particles

Production Examples 2 to 5

Graphitized Particles a-2 to a-5 having volume-average particle diameter as shown in Table 1 were prepared in the same manner as in Graphitized Particles Production Example 1 except that firing temperature and classification conditions were changed. Physical properties of Graphitized Particles a-2 to a-5 are shown in Table 1.

Graphitized Particles

Production Example 6

To obtain the graphitized particles, mesocarbon microbeads obtained by heat treatment of coal type heavy oil were washed and then dried, and thereafter the dried product was mechanically dispersed by means of an atomizer mill, followed by primary heat treatment at 1,200° C. in an atmosphere of nitrogen to effect carbonization. Next, the carbonized beads were subjected to secondary dispersion by means of the atomizer mill, followed by heat treatment at 2,800° C. in an atmosphere of nitrogen, and further followed by classification to obtain graphitized particles with a volume-average particle diameter of 2.6 μm, which were designated as Graphitized Particles a-6. Physical properties of Graphitized Particles a-6 are shown in Table 1.

Graphitized Particles

Production Examples 7 & 8

Graphitized Particles a-7 and a-8 having volume-average particle diameter as shown in Table 1 were prepared in the same manner as in Graphitized Particles Production Example 6 except that firing temperature and classification conditions were changed. Physical properties of Graphitized Particles a-7 and a-8 are shown in Table 1.

Graphitized Particles

Production Examples 9 & 10

To obtain the graphitized particles, coke and tar pitch were fired at 2,800° C. to effect graphitization, further followed by classification to obtain Graphitized Particles a-9 and a-10 with volume-average particle diameters of 2.5 μm and 4.0 μm, respectively. Physical properties of Graphitized Particles a-9 and a-10 are shown in Table 1.

Graphitized Particles

Production Examples 11 & 12

To obtain the graphitized particles, spherical phenol resin particles with a volume-average particle diameter of 3.0 μm and spherical phenol resin particles with a volume-average particle diameter of 4.5 μm, respectively, were fired at 2,200° C. in an atmosphere of nitrogen to effect graphitization, further followed by classification to obtain Graphitized Particles a-11 and a-12 with volume-average particle diameters of 2.3 μm and 3.8 μm, respectively. Physical properties of Graphitized Particles a-11 and a-12 are shown in Table 1.

Unevenness Formative Particles

Production Example 1

Unevenness formative particles were prepared which were to be used in the resin coat layer formed at the developing sleeve surface. To obtain the unevenness formative particles, 100 parts of spherical phenol resin particles with a volume-average particle diameter of 3.0 μm were uniformly coated with 14 parts of coal type bulk-mesophase pitch with a number-average particle diameter of 1.0 μm or less by means of an automated mortar (automatic stone mill, manufactured by Ishikawa Kojo), followed by heat stabilization treatment in an oxidizing atmosphere and thereafter firing at 2,000° C. to prepare conductive spherical carbon particles. This spherical carbon particles were designated as Unevenness Formative Particles e-1. Physical properties of Unevenness Formative Particles e-1 are shown in Table 2.

Unevenness Formative Particles

Production Example 2

Spherical carbon particles were prepared in the same manner as in Unevenness Formative Particles Production Example 1 except that spherical phenol resin particles with a volume-average particle diameter of 4.0 μm were used, to obtain spherical carbon particles with a volume-average particle diameter of 3.8 μm. The spherical carbon particles obtained were designated as Unevenness Formative Particles e-2. Physical properties of Unevenness Formative Particles e-2 are shown in Table 2.

Unevenness Formative Particles

Production Example 3

To obtain the spherical carbon particles, 100 parts of polymethyl methacrylate resin (PMMA resin) and 25 parts of carbon black were melt-mixed, followed by kneading, pulverization, and classification to obtain PMMA resin particles with a volume-average particle diameter of 3.1 μm, containing carbon black, which were thereafter subjected to spherical treatment by means of Hybridizer (manufactured by Nara Machinery Co., Ltd.) to obtain spherical carbon-black-dispersed PMMA resin particles with a volume-average particle diameter of 2.3 μm. This carbon-black-dispersed PMMA resin particles were designated as Unevenness Formative Particles e-3. Physical properties of Unevenness Formative Particles e-3 are shown in Table 2.

Unevenness Formative Particles

Production Example 4

Carbon-black-dispersed PMMA resin particles with a volume-average particle diameter of 4.6 μm were prepared in the same manner as in Unevenness Formative Particles Production Example 3, which were then treated in the same manner as in Unevenness Formative Particles Production Example 3 to obtain spherical carbon-black-dispersed PMMA resin particles with a volume-average particle diameter of 3.9 μm. The carbon-black-dispersed PMMA resin particles obtained were designated as Unevenness Formative Particles e-4. Physical properties of Unevenness Formative Particles e-4 are shown in Table 2.

Developing Sleeve

Production Example 1

A coating material for forming the resin coat layer at the developing sleeve surface by coating was prepared.

| | |
|---|---|
| Resol type phenol resin solution (50% methanol solution) | 200 parts |
| Graphitized Particles a-1 | 45 parts |
| Conductive carbon black | 5 parts |
| Isopropyl alcohol | 220 parts |

The above materials were subjected to dispersion by means of a sand mill. First, the phenol resin solution was diluted with part of the isopropyl alcohol. To the resultant mixture, Graphitized Particles a-1 and the conductive carbon black were added, followed by sand mill dispersion using glass beads of 1 mm in diameter as a media. To the dispersion formed, the remaining phenol resin solution and isopropyl alcohol were added to make up a coating material having a solid content of about 32%. This coating material was applied by spraying on the surface of a cylindrical substrate made of aluminum, of 24.5 mm in outer diameter to form thereon a wet resin coat layer of about 12 μm in thickness. This was dried and cured at 150° C. for 30 minutes by means of a hot-air dryer. Thereafter, a magnet roller and flanges were attached to obtain Developing Sleeve B-1. Make-up and physical properties of the resin coat layer obtained are shown in Table 3.

Developing Sleeve

Production Examples 2 to 21

Developing Sleeves B-2 to B-13 and C-1 to C-8 were produced in the same manner as in Developing Sleeve Production Example 1 except that coating materials were prepared using materials and in mixing ratios as shown in Table 3. In regard to Developing Sleeves B-9 to B-13 and C-5 to C-8, cylindrical substrates made of aluminum, of 20.0 mm in outer diameter were used as substrates. Make-up and physical properties of the resin coat layer obtained are shown in Table 3. In regard to Developing Sleeves B-2, B-4, B-8 and B-10, Compounds 1 and 2 shown below were used as charge control agents.

(Compound 1)

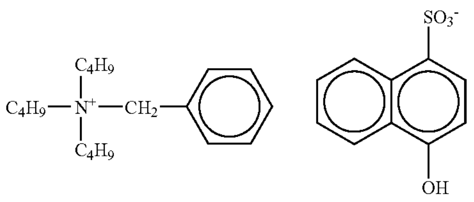

(Compound 2)

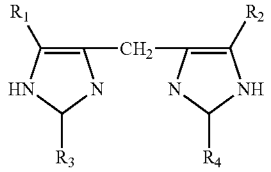

Toner Production Example 1

An insulating negatively chargeable magnetic toner was produced as a one-component developer.

| | |
|---|---|
| Styrene-acrylic resin | 100 parts |
| Magnetite | 90 parts |
| Negative charge control agent (chromium complex of salicylic acid) | 2 parts |
| Hydrocarbon wax | 5 parts |

The above materials were mixed using a Henschel mixer, and the mixture obtained was melt-kneaded and dispersed by means of a twin-screw extruder. The kneaded product obtained was cooled and thereafter finely pulverized using a grinding mill making use of jet streams. The pulverized product obtained was further classified by means of an air-classifier to obtain magnetic toner particles having a weight-average particle diameter of 6.7 μm and such distribution that particles of 4 μm or less in particle diameter were in a number proportion of 14.6% and particles of 10.1 μm or more in particle diameter were in a weight proportion of 3.0%. Next, to 100 parts of the magnetic toner particles, 1.0 part of hydrophobic colloidal silica fine powder and 3.0 parts of strontium titanate fine powder were externally added using a Henschel mixer to obtain Magnetic Toner a as the one-component developer.

Toner Production Example 2

An insulating negatively chargeable magnetic toner was produced as a one-component developer.

| | |
|---|---|
| Styrene-acrylic resin | 100 parts |
| Magnetite | 90 parts |

-continued

| | |
|---|---|
| Negative charge control agent (iron complex of azo type) | 2 parts |
| Hydrocarbon wax | 5 parts |

The above materials were mixed using a Henschel mixer, and the mixture obtained was melt-kneaded and dispersed by means of a twin-screw extruder. The kneaded product obtained was cooled and thereafter finely pulverized using a grinding mill making use of jet streams. The pulverized product obtained was further classified by means of an air-classifier to obtain magnetic toner particles having a weight-average particle diameter of 6.2 μm and such distribution that particles of 4 μm or less in particle diameter were in a number proportion of 16.8% and particles of 10.1 μm or more in particle diameter were in a weight proportion of 2.2%. Next, to 100 parts of the magnetic toner particles, 1.0 part of hydrophobic colloidal silica fine powder was externally added using a Henschel mixer to obtain Magnetic Toner β as the one-component developer.

Example 1

Using Developing Sleeve B-1 and Magnetic Toner α, which were set in the developing apparatus shown in FIG. 2, image reproduction was evaluated. To reproduce images, a remodeled machine of image Runner 6000, a copying machine manufactured by CANON INC., was used, where a stated development bias was applied, and image reproduction was evaluated. Images were reproduced on up to 500,000 sheets in environments of normal temperature and normal humidity (N/N) of 23° C. and 60% RH, normal temperature and low humidity (N/L) of 23° C. and 5% RH, and high temperature and high humidity (H/H) of 30° C. and 80% RH. Results of evaluation made by the following methods are shown in Table 4.

—Evaluation Methods—

(1) Charge Quantity (Q/M) and Toner Transport Quantity (MIS) of Magnetic Toner on Developing Sleeve:

The magnetic toner carried on the developing sleeve was collected by suction through a metal cylindrical tube and a cylindrical filter, where the charge quantity Q/M per unit weight (mC/kg) and the weight of magnetic toner per unit area M/S (mg/cm$^2$) were calculated from the charge quantity Q accumulated in a capacitor through the metal cylindrical tube, the weight M of the magnetic toner collected and the area S over which the magnetic toner was sucked, to find magnetic-toner charge quantity (Q/M) and magnetic-toner transport quantity (M/S), respectively.

(2) Image Density:

The density of solid black images was measured with a reflection densitometer RD918 (manufactured by Macbeth Co.) as reflection density, and an average value at 5 spots was regarded as the image density.

(3) Fog and Reversal Fog:

The reflectance of solid white images were measured, and also the reflectance of a virgin transfer sheet was measured. The value of (worst value of reflectance of solid white image)−(maximum value of reflectance of virgin transfer sheet) was regarded as the fog density. The reflectance was measured with TC-6DS (manufactured by Tokyo Denshoku). Note that, when the measured value is judged by visual observation, 1.5 or less is a level at which fog is almost not recognizable by visual observation, 2.0 to 3.0 is a level at which fog is recognizable in careful observation, and more than 4.0 is a level at which fog is clearly recognizable.

(4) Spots Around Character Images:

Using a character chart of about 6.0% in image percentage, characters on images obtained were magnified 100 times with an optical microscope to observe how spots around images stood. The results of evaluation are shown by marks of A to E ranks.

(5) Solid Image Lines and Non-uniformity:

A solid black image and a halftone (HT) image were formed by development. In the respective images, lines and non-uniformity were visually observed. The results of evaluation are shown by marks of A to E ranks.

(6) Toner Contamination and Toner Melt Adhesion (Contamination and Melt Adhesion) to Developing Sleeve Surface:

After the image reproduction was evaluated in each environment, the developing sleeve was detached, and how the toner adhered to the sleeve surface was observed with an electric-field emission/scanning microscope (FE-SEM). The results of evaluation are shown by marks of A to E ranks.

Examples 2 to 8 & Comparative Examples 1 to 4

Images were reproduced and evaluated in the same manner as in Example 1 except that, in place of Developing Sleeve B-1 used therein, Developing Sleeves B-2 to B-8 and C-1 to C-4, respectively, were used. The results of evaluation are shown in Tables 4 and 5.

Example 9

Using Developing Sleeve B-9 and Magnetic Toner β, which were set in the developing apparatus shown in FIG. 3, image reproduction was evaluated. To reproduce images, a remodeled machine of LBP930EX, a laser beam printer manufactured by CANON INC., was used, where a stated development bias was applied, and image reproduction was evaluated. Images were reproduced on up to 50,000 sheets in environments of normal temperature and normal humidity (N/N) of 23° C. and 60% RH, low temperature and low humidity (L/L) of 15° C. and 10% RH, and high temperature and high humidity (H/H) of 32.5° C. and 85% RH. Evaluation was made in the same manner as in Example 1. Evaluation results obtained are shown in Table 6.

Examples 10 to 13 & Comparative Examples 5 to 8

Images were reproduced and evaluated in the same manner as in Example 9 except that, in place of Developing Sleeve B-9 used therein, Developing Sleeves B-10 to B-13 and C-5 to C-8, respectively, were used. The results of evaluation are shown in Tables 6 and 7.

TABLE 1

Physical Properties of Graphitized Particles Used in Examples and Comparative Examples

| Graphitized particles | Raw material | Firing temp. (° C.) | Lattice spacing d(002) (Å) | Degree of graphitization p(002) | Volume = average particle diameter (μm) |
|---|---|---|---|---|---|
| a-1 | Bulk-mesophase pitch particles | 3,000 | 3.3662 | 0.38 | 2.4 |
| a-2 | Bulk-mesophase pitch particles | 3,200 | 3.3576 | 0.20 | 2.3 |
| a-3 | Bulk-mesophase pitch particles | 2,300 | 3.4310 | 0.95 | 2.6 |
| a-4 | Bulk-mesophase pitch particles | 3,000 | 3.3678 | 0.40 | 3.9 |
| a-5 | Bulk-mesophase pitch particles | 3,000 | 3.3636 | 0.33 | 0.6 |
| a-6 | Mesocarbon microbeads | 2,800 | 3.3682 | 0.41 | 2.6 |
| a-7 | Mesocarbon microbeads | 2,400 | 3.4052 | 0.77 | 0.8 |
| a-8 | Mesocarbon microbeads | 2,800 | 3.3692 | 0.42 | 4.0 |
| a-9 | Coke and tar pitch | 2,800 | 3.3560 | 0.15 | 2.5 |
| a-10 | Coke and tar pitch | 2,800 | 3.3570 | 0.19 | 4.0 |
| a-11 | Phenol resin particles | 2,200 | Not measurable | Not measurable | 2.3 |
| a-12 | Phenol resin particles | 2,200 | Not measurable | Not measurable | 3.8 |

TABLE 2

Particles for Forming Unevenness on Coat Layer

| Unevenness formative particles | Material | Volume = average particle diameter (μm) | True density (g/cm$^3$) | Volume resistivity (Ω · cm) | Shape (length/breadth) |
|---|---|---|---|---|---|
| e-1 | Carbonized product (treated at 2,000° C.) | 2.2 | 1.52 | $6.8 \times 10^{-2}$ | Spherical (1.13) |
| e-2 | Carbonized product (treated at 2,000° C.) | 3.8 | 1.49 | $7.7 \times 10^{-2}$ | Spherical (1.15) |
| e-3 | Carbon-black-dispersed PMMA resin | 2.3 | 1.24 | $1.5 \times 10^{1}$ | Spherical (1.12) |
| e-4 | Carbon-black-dispersed PMMA resin | 3.9 | 1.22 | $2.0 \times 10^{1}$ | Spherical (1.14) |
| e-5 | Silicone resin | 5.1 | 1.09 | $10^{6}$ or more | Spherical (1.06) |
| e-6 | Alumina | 4.8 | 2.71 | $10^{-3}$ or less | Granular (1.31) |

TABLE 3

Make-up and Physical Properties of Resin Coat Layer of Developing Sleeve Surface

| | | Make-up and physical properties of resin coat layer | | | | | | | | |
|---|---|---|---|---|---|---|---|---|---|---|
| | Developing sleeve | Binder resin (Amount) (pbw) | Graphitized particles (Amt.) (pbw) | Conducting agent (Amount) (pbw) | Charge control agent (Amt.) (pbw) | Unevenness formative particles (Amt.) (pbw) | Hardness average value A | Hardness standard deviation σ | Volume resistivity (Ω · cm) | Surface roughness Ra (μm) |
| Example: | | | | | | | | | | |
| 1 | B-1 | Phenol resin (100) | a-1 (45) | Carbon black (5) | — | — | 390 | 22 | 0.9 | 0.45 |
| 2 | B-2 | Phenol resin (100) | a-1 (45) | Carbon black (5) | Comp. 1 (5) | — | 386 | 23 | 1.0 | 0.44 |
| 3 | B-3 | Phenol resin (100) | a-2 (45) | Carbon black (5) | — | — | 382 | 21 | 0.6 | 0.47 |
| 4 | B-4 | Phenol resin (100) | a-3 (45) | Carbon black (10) | Comp. 1 (10) | — | 402 | 26 | 2.4 | 0.44 |
| 5 | B-5 | Phenol resin (100) | a-5 (40) | Carbon black (5) | — | e-1 (5) | 420 | 28 | 1.2 | 0.49 |
| 6 | B-6 | Phenol resin (100) | a-5 (40) | Carbon black (5) | — | e-3 (5) | 380 | 20 | 4.6 | 0.48 |
| 7 | B-7 | Phenol resin (100) | a-6 (45) | Carbon black (5) | — | — | 405 | 24 | 1.1 | 0.51 |
| 8 | B-8 | Phenol resin (100) | a-7 (45) | Carbon black (10) | Comp. 1 (10) | — | 416 | 26 | 3.9 | 0.50 |

TABLE 3-continued

Make-up and Physical Properties of Resin Coat Layer of Developing Sleeve Surface

| | Developing sleeve | Binder resin (Amount) (pbw) | Graphitized particles (Amt.) (pbw) | Conducting agent (Amount) (pbw) | Charge control agent (Amt.) (pbw) | Unevenness formative particles (Amt.) (pbw) | Hardness average value A | Hardness standard deviation σ | Volume resistivity (Ω · cm) | Surface roughness Ra (μm) |
|---|---|---|---|---|---|---|---|---|---|---|
| | | Make-up and physical properties of resin coat layer | | | | | | | | |
| Comparative Example: | | | | | | | | | | |
| 1 | C-1 | Phenol resin (100) | a-9 (45) | Carbon black (5) | — | — | 340 | 27 | 1.0 | 0.46 |
| 2 | C-2 | Phenol resin (100) | a-11 (45) | Carbon black (5) | — | — | 456 | 95 | 23.5 | 0.49 |
| 3 | C-3 | Phenol resin (100) | a-9 (40) | Carbon black (5) | — | e-5 (5) | 310 | 106 | 58.6 | 0.52 |
| 4 | C-4 | Phenol resin (100) | a-9 (40) | Carbon black (5) | — | e-6 (5) | 640 | 134 | 0.7 | 0.51 |
| Example: | | | | | | | | | | |
| 9 | B-9 | Phenol resin (100) | a-4 (70) | Carbon black (10) | — | — | 407 | 25 | 0.2 | 0.65 |
| 10 | B-10 | Phenol resin (100) | a-4 (70) | Carbon black (10) | Comp. 2 (5) | — | 412 | 26 | 0.4 | 0.67 |
| 11 | B-11 | Phenol resin (100) | a-1 (60) | Carbon black (10) | — | e-2 (10) | 454 | 28 | 0.3 | 0.68 |
| 12 | B-12 | Phenol resin (100) | a-1 (60) | Carbon black (10) | — | e-4 (10) | 392 | 29 | 0.5 | 0.69 |
| 13 | B-13 | Phenol resin (100) | a-8 (70) | Carbon black (10) | — | — | 421 | 29 | 0.4 | 0.67 |
| Comparative Example: | | | | | | | | | | |
| 5 | C-5 | Phenol resin (100) | a-10 (70) | Carbon black (10) | — | — | 305 | 23 | 0.3 | 0.66 |
| 6 | C-6 | Phenol resin (100) | a-12 (70) | Carbon black (10) | — | — | 502 | 125 | 10.6 | 0.68 |
| 7 | C-7 | Phenol resin (100) | a-10 (60) | Carbon black (10) | — | e-5 (10) | 276 | 141 | 33.3 | 0.72 |
| 8 | C-8 | Phenol resin (100) | a-10 (60) | Carbon black (10) | — | e-6 (10) | 680 | 167 | 0.1 | 0.71 |

TABLE 4

Results of evaluation in each environment in Examples 1 to 8

| Example: | Environment | Surface roughness I (μm) | Surface roughness II (μm) | Q/M I (mC/kg) | Q/M II (mC/kg) | M/S I (mg/cm²) | M/S II (mg/cm²) | Image density I | Image density II | Fog I | Fog II | Spots around char. images I | Spots around char. images II | Solid image lines & non-uniformity I | Solid image lines & non-uniformity II | Contamination & melt adhesion I | Contamination & melt adhesion II |
|---|---|---|---|---|---|---|---|---|---|---|---|---|---|---|---|---|---|
| 1 | N/N | 0.45 | 0.33 | −9.5 | −8.6 | 0.88 | 0.78 | 1.41 | 1.38 | 1.6 | 1.4 | A | A | A | A | A | A |
| | N/L | ” | 0.34 | −10.8 | −9.7 | 0.95 | 0.86 | 1.43 | 1.40 | 2.1 | 1.8 | B | A | A | A | A | A |
| | H/H | ” | 0.32 | −8.6 | −7.5 | 0.81 | 0.70 | 1.39 | 1.36 | 1.1 | 0.9 | A | A | A | B | A | B |
| 2 | N/N | 0.44 | 0.32 | −10.6 | −10.1 | 0.87 | 0.76 | 1.42 | 1.39 | 1.3 | 1.1 | A | A | A | B | A | A |
| | N/L | ” | 0.33 | −11.9 | −11.5 | 0.94 | 0.84 | 1.44 | 1.42 | 1.8 | 1.5 | A | A | A | A | A | A |
| | H/H | ” | 0.30 | −9.8 | −9.2 | 0.80 | 0.69 | 1.40 | 1.38 | 0.9 | 0.7 | A | A | A | B | A | B |
| 3 | N/N | 0.47 | 0.34 | −9.3 | −8.4 | 0.90 | 0.79 | 1.40 | 1.37 | 1.7 | 1.5 | A | A | A | B | A | B |
| | N/L | ” | 0.35 | −10.5 | −9.4 | 0.97 | 0.87 | 1.42 | 1.39 | 2.2 | 1.9 | B | A | A | A | A | A |
| | H/H | ” | 0.33 | −8.3 | −7.2 | 0.84 | 0.70 | 1.38 | 1.35 | 1.2 | 1.0 | A | A | A | B | A | B |
| 4 | N/N | 0.44 | 0.34 | −9.0 | −8.0 | 0.87 | 0.77 | 1.39 | 1.36 | 2.1 | 1.8 | B | A | A | B | A | B |
| | N/L | ” | 0.35 | −10.2 | −9.1 | 0.94 | 0.85 | 1.41 | 1.38 | 2.6 | 2.3 | B | B | A | A | A | A |
| | H/H | ” | 0.33 | −8.0 | −6.9 | 0.80 | 0.69 | 1.37 | 1.34 | 1.6 | 1.4 | A | A | A | B | A | B |
| 5 | N/N | 0.49 | 0.61 | −9.2 | −8.3 | 0.92 | 1.02 | 1.41 | 1.39 | 1.5 | 1.8 | A | A | A | A | A | A |
| | N/L | ” | 0.59 | −10.5 | −9.4 | 0.99 | 1.08 | 1.43 | 1.41 | 2.0 | 2.3 | B | B | A | A | A | A |
| | H/H | ” | 0.63 | −8.3 | −7.2 | 0.85 | 0.94 | 1.39 | 1.37 | 1.2 | 1.5 | A | A | A | B | A | B |
| 6 | N/N | 0.48 | 0.30 | −9.4 | −8.2 | 0.89 | 0.75 | 1.41 | 1.35 | 1.8 | 1.9 | A | A | A | B | A | B |
| | N/L | ” | 0.32 | −10.7 | −9.2 | 0.96 | 0.83 | 1.42 | 1.36 | 2.3 | 2.4 | B | B | A | A | A | A |
| | H/H | ” | 0.28 | −8.5 | −7.0 | 0.82 | 0.67 | 1.38 | 1.32 | 1.3 | 1.4 | A | A | A | B | A | B |

TABLE 4-continued

Results of evaluation in each environment in Examples 1 to 8

| Example: | Environment | Surface roughness I (μm) | Surface roughness II (μm) | Q/M I (mC/kg) | Q/M II (mC/kg) | M/S I (mg/cm²) | M/S II (mg/cm²) | Image density I | Image density II | Fog I | Fog II | Spots around char. images I | Spots around char. images II | Solid image lines & non-uniformity I | Solid image lines & non-uniformity II | Contamination & melt adhesion I | Contamination & melt adhesion II |
|---|---|---|---|---|---|---|---|---|---|---|---|---|---|---|---|---|---|
| 7 | N/N | 0.51 | 0.40 | −9.3 | −8.3 | 0.93 | 0.83 | 1.41 | 1.37 | 1.7 | 1.5 | A | A | A | A | A | A |
| | N/L | ” | 0.41 | −10.5 | −9.3 | 1.00 | 0.91 | 1.43 | 1.39 | 2.2 | 1.9 | B | A | A | A | A | A |
| | H/H | ” | 0.39 | −8.3 | −7.1 | 0.86 | 0.75 | 1.39 | 1.35 | 1.2 | 1.0 | A | A | A | B | A | B |
| 8 | N/N | 0.50 | 0.41 | −8.8 | −7.8 | 0.92 | 0.81 | 1.38 | 1.35 | 2.3 | 2.0 | B | B | A | B | A | B |
| | N/L | ” | 0.42 | −9.9 | −8.8 | 0.99 | 0.89 | 1.40 | 1.37 | 2.8 | 2.5 | B | B | A | A | A | A |
| | H/H | ” | 0.40 | −7.8 | −6.5 | 0.85 | 0.73 | 1.36 | 1.33 | 1.8 | 1.6 | A | A | A | B | A | B |

I: Initial stage II: 500,000 sheets

TABLE 5

Results of evaluation in each environment in Comparative Examples 1 to 4

| Comparative Example: | Environment | Surface roughness I (μm) | Surface roughness II (μm) | Q/M I (mC/kg) | Q/M II (mC/kg) | M/S I (mg/cm²) | M/S II (mg/cm²) | Image density I | Image density II | Fog I | Fog II | Spots around char. images I | Spots around char. images II | Solid image lines & non-uniformity I | Solid image lines & non-uniformity II | Contamination & melt adhesion I | Contamination & melt adhesion II |
|---|---|---|---|---|---|---|---|---|---|---|---|---|---|---|---|---|---|
| 1 | N/N | 0.46 | 0.15 | −8.4 | −5.2 | 0.83 | 0.45 | 1.39 | 1.08 | 1.7 | 1.6 | A | B | A | C | A | C |
| | N/L | ” | 0.17 | −9.9 | −5.9 | 0.90 | 0.52 | 1.41 | 1.09 | 2.2 | 2.1 | B | C | A | C | A | C |
| | H/H | ” | 0.12 | −7.2 | −4.4 | 0.76 | 0.39 | 1.37 | 1.05 | 1.2 | 1.1 | A | B | A | D | A | D |
| 2 | N/N | 0.49 | 0.73 | −5.4 | −3.2 | 0.85 | 1.12 | 1.32 | 1.01 | 2.3 | 2.8 | B | C | B | D | B | D |
| | N/L | ” | 0.71 | −6.8 | −3.7 | 0.92 | 1.19 | 1.34 | 1.02 | 2.6 | 3.2 | B | D | B | C | B | C |
| | H/H | ” | 0.75 | −4.2 | −2.6 | 0.78 | 1.06 | 1.28 | 0.97 | 2.0 | 2.6 | B | C | B | D | B | E |
| 3 | N/N | 0.52 | 0.16 | −7.2 | −4.9 | 0.86 | 0.46 | 1.36 | 1.05 | 2.0 | 2.2 | B | D | B | D | B | D |
| | N/L | ” | 0.18 | −8.4 | −5.7 | 0.93 | 0.53 | 1.38 | 1.06 | 2.5 | 2.7 | B | D | B | D | B | D |
| | H/H | ” | 0.13 | −6.0 | −3.8 | 0.79 | 0.39 | 1.34 | 1.01 | 1.6 | 1.8 | B | C | C | E | C | E |
| 4 | N/N | 0.51 | 0.81 | −8.2 | −3.4 | 0.85 | 1.19 | 1.37 | 1.05 | 1.8 | 2.6 | B | C | B | E | B | E |
| | N/L | ” | 0.79 | −9.7 | −4.0 | 0.92 | 1.25 | 1.39 | 1.07 | 2.3 | 3.1 | B | D | B | D | B | D |
| | H/H | ” | 0.83 | −7.0 | −3.0 | 0.77 | 1.11 | 1.34 | 0.99 | 1.4 | 2.2 | B | C | C | E | C | E |

I: Initial stage II: 500,000 sheets

TABLE 6

Results of evaluation in each environment in Examples 9 to 13

| Example: | Environment | Surface roughness I (μm) | Surface roughness II (μm) | Q/M I (mC/kg) | Q/M II (mC/kg) | M/S I (mg/cm²) | M/S II (mg/cm²) | Image density I | Image density II | Fog I | Fog II | Spots around char. images I | Spots around char. images II | Solid image lines & non-uniformity I | Solid image lines & non-uniformity II | Contamination & melt adhesion I | Contamination & melt adhesion II |
|---|---|---|---|---|---|---|---|---|---|---|---|---|---|---|---|---|---|
| 9 | N/N | 0.65 | 0.49 | −11.5 | −10.2 | 1.20 | 1.05 | 1.45 | 1.41 | 1.8 | 1.6 | A | A | A | B | A | B |
| | L/L | ” | 0.51 | −12.8 | −11.5 | 1.32 | 1.08 | 1.48 | 1.44 | 2.2 | 1.9 | B | A | A | A | A | A |
| | H/H | ” | 0.46 | −10.1 | −8.5 | 1.07 | 0.92 | 1.42 | 1.38 | 1.4 | 1.2 | A | A | A | B | A | B |
| 10 | N/N | 0.67 | 0.50 | −12.0 | −10.5 | 1.21 | 1.06 | 1.46 | 1.43 | 1.5 | 1.3 | A | A | A | B | A | B |
| | L/L | ” | 0.52 | −13.2 | −12.0 | 1.33 | 1.10 | 1.49 | 1.46 | 1.9 | 1.6 | A | A | A | A | A | A |
| | H/H | ” | 0.46 | −10.5 | −9.0 | 1.08 | 0.94 | 1.44 | 1.40 | 1.2 | 1.0 | A | A | A | B | A | B |
| 11 | N/N | 0.68 | 0.65 | −11.2 | −10.4 | 1.22 | 1.11 | 1.44 | 1.42 | 1.7 | 1.9 | A | A | A | A | A | A |
| | L/L | ” | 0.67 | −12.5 | −11.7 | 1.35 | 1.26 | 1.47 | 1.45 | 2.1 | 2.3 | B | B | A | A | A | A |
| | H/H | ” | 0.63 | −9.7 | −8.8 | 1.10 | 0.99 | 1.42 | 1.39 | 1.3 | 1.6 | A | A | A | B | A | B |
| 12 | N/N | 0.69 | 0.52 | −11.3 | −10.0 | 1.22 | 1.06 | 1.45 | 1.40 | 2.0 | 2.1 | B | B | A | B | A | B |
| | L/L | ” | 0.54 | −12.7 | −11.2 | 1.34 | 1.10 | 1.47 | 1.43 | 2.4 | 2.5 | B | B | A | B | A | B |
| | H/H | ” | 0.49 | −9.9 | −8.4 | 1.09 | 0.94 | 1.42 | 1.37 | 1.6 | 1.8 | A | A | A | C | A | C |

TABLE 6-continued

Results of evaluation in each environment in Examples 9 to 13

| Example: | Environment | Surface roughness I (μm) | Surface roughness II (μm) | Q/M I (mC/kg) | Q/M II (mC/kg) | M/S I (mg/cm²) | M/S II (mg/cm²) | Image density I | Image density II | Fog I | Fog II | Spots around char. images I | Spots around char. images II | Solid image lines & non-uniformity I | Solid image lines & non-uniformity II | Contamination & melt adhesion I | Contamination & melt adhesion II |
|---|---|---|---|---|---|---|---|---|---|---|---|---|---|---|---|---|---|
| 13 | N/N | 0.67 | 0.51 | −11.1 | −9.8 | 1.23 | 1.08 | 1.44 | 1.40 | 2.0 | 1.8 | B | A | A | B | A | B |
| | L/L | ” | 0.53 | −12.4 | −10.9 | 1.35 | 1.11 | 1.47 | 1.43 | 2.4 | 2.2 | B | B | A | A | A | A |
| | A/H | ” | 0.49 | −9.7 | −8.0 | 1.10 | 0.96 | 1.41 | 1.36 | 1.6 | 1.5 | A | A | A | B | A | B |

I: Initial stage II: 50,000 sheets

TABLE 7

Results of evaluation in each environment in Comparative Examples 5 to 8

| Comparative Example: | Environment | Surface roughness I (μm) | Surface roughness II (μm) | Q/M I (mC/kg) | Q/M II (mC/kg) | M/S I (mg/cm²) | M/S II (mg/cm²) | Image density I | Image density II | Fog I | Fog II | Spots around char. images I | Spots around char. images II | Solid image lines & non-uniformity I | Solid image lines & non-uniformity II | Contamination & melt adhesion I | Contamination & melt adhesion II |
|---|---|---|---|---|---|---|---|---|---|---|---|---|---|---|---|---|---|
| 5 | N/N | 0.66 | 0.26 | −10.5 | −7.2 | 1.18 | 0.79 | 1.42 | 1.11 | 2.0 | 1.9 | B | B | A | C | A | C |
| | L/L | ” | 0.29 | −11.6 | −8.4 | 1.29 | 0.91 | 1.45 | 1.14 | 2.4 | 2.3 | B | C | A | C | A | C |
| | H/H | ” | 0.23 | −9.4 | −6.2 | 1.04 | 0.63 | 1.39 | 1.07 | 1.6 | 1.4 | A | B | A | D | A | D |
| 6 | N/N | 0.68 | 0.46 | −7.4 | −5.1 | 1.19 | 0.85 | 1.35 | 1.06 | 2.6 | 3.2 | B | C | B | D | B | D |
| | L/L | ” | 0.48 | −8.5 | −6.1 | 1.30 | 0.97 | 1.38 | 1.09 | 3.1 | 3.8 | C | D | B | C | B | C |
| | H/H | ” | 0.44 | −6.2 | −4.1 | 1.05 | 0.70 | 1.32 | 0.99 | 2.2 | 2.7 | B | C | B | D | B | E |
| 7 | N/N | 0.72 | 0.22 | −9.2 | −5.9 | 1.21 | 0.74 | 1.38 | 1.08 | 2.3 | 2.6 | B | C | B | D | B | D |
| | L/L | ” | 0.24 | −10.2 | −7.3 | 1.32 | 0.85 | 1.40 | 1.10 | 2.9 | 3.2 | B | D | B | D | B | D |
| | H/H | ” | 0.19 | −8.1 | −4.9 | 1.07 | 0.57 | 1.35 | 1.01 | 1.9 | 2.1 | B | C | C | E | C | E |
| 8 | N/N | 0.71 | 0.73 | −10.1 | −4.7 | 1.22 | 1.24 | 1.37 | 1.06 | 2.2 | 3.1 | B | D | C | E | C | E |
| | L/L | ” | 0.72 | −11.1 | −5.6 | 1.33 | 1.35 | 1.39 | 1.08 | 2.8 | 3.7 | B | D | B | D | B | D |
| | H/H | ” | 0.76 | −8.9 | −3.7 | 1.09 | 1.13 | 1.34 | 0.98 | 1.8 | 2.5 | B | C | D | E | D | E |

I: Initial stage II: 50,000 sheets

What is claimed is:

1. A developer carrying member for carrying a developer, comprising:

a substrate; and a resin coat layer formed on a surface of the substrate, wherein said resin coat layer contains at least a phenol resin as a binder resin and graphitized particles, wherein said graphitized particles are prepared by heat treatment of particles which are optically anisotropic and formed of a single phase, in an inert atmosphere at 2,300 to 3,200° C., said particles being mesophase pitch, and said graphitized particles have a degree of graphitization p (002) of 0.20≦p (002)≦0.95, and wherein the surface of said resin coat layer has an average value A and a standard deviation σ of:

$$100 \leqq A \leqq 800 (N/mm^2); \text{ and}$$

$$\sigma < 30 (N/mm^2);$$

which are determined from the hardness distribution of measured values HU of universal hardness in a surface physical-property test, calculated according to the following expression:

$$\text{universal hardness value } HU = K \times F / h^2 (N/mm^2),$$

where K represents a constant, F represents a test load (N), and h represents the maximum indentation depth (mm) of an indenter, and wherein said graphitized particles have a volume-average particle diameter in a range of 0.5 μm to 4.0 μm, and the surface of said resin coat layer has an arithmetic-mean roughness Ra in a range of 0.20 μm to 0.70 μm according to JIS B 0601.

2. The developer carrying member according to claim 1, wherein said resin coat layer further contains a charge control agent for controlling the charging of a developer.

3. The developer carrying member according to claim 1, wherein said particles, which are optically anisotropic and formed of a single phase, have stacks of aromatic molecules.

* * * * *